Jan. 31, 1956     D. H. DODD     2,732,607
METHOD FOR MAKING STRUCTURAL MEMBERS
Filed May 31, 1950     14 Sheets-Sheet 1
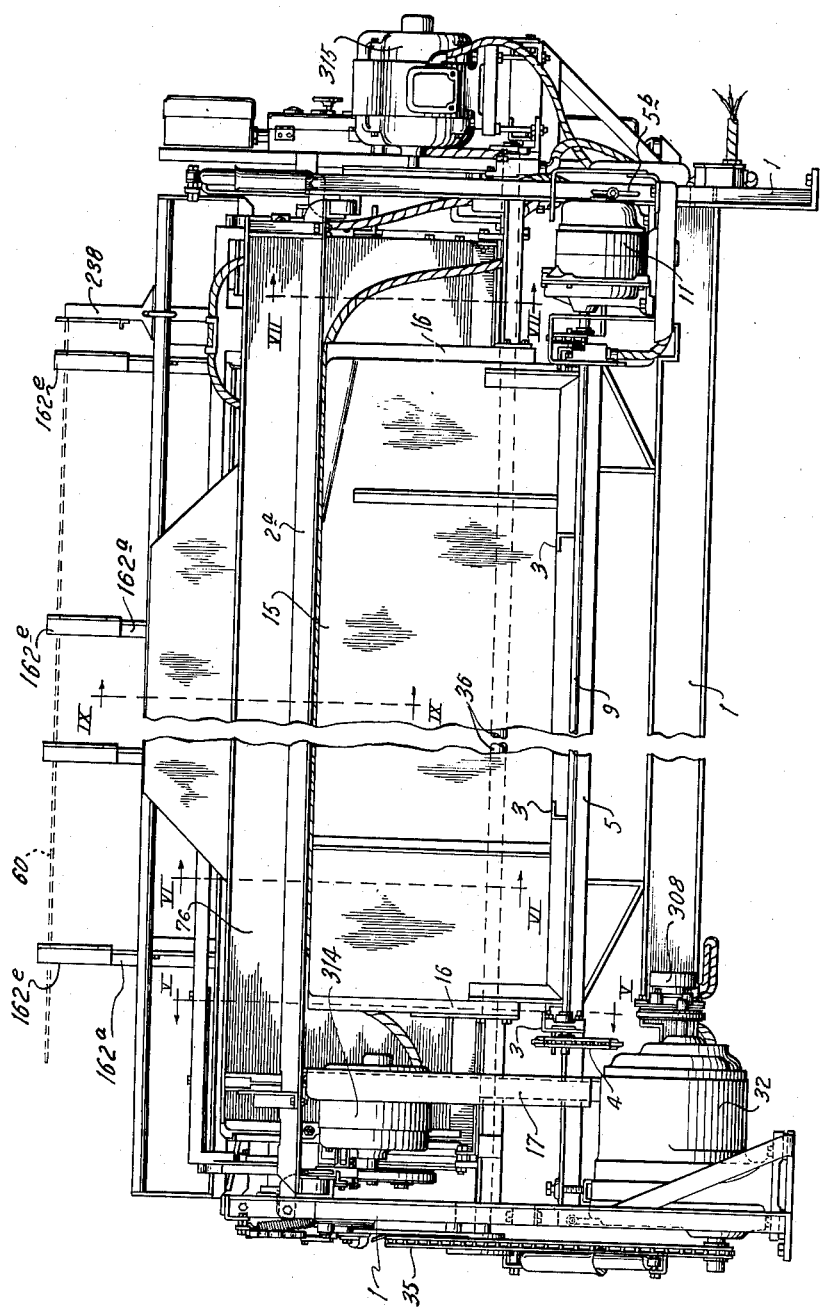
Fig. I
INVENTOR.
David H. Dodd
BY
ATTORNEY Jan. 31, 1956  D. H. DODD  2,732,607
METHOD FOR MAKING STRUCTURAL MEMBERS
Filed May 31, 1950  14 Sheets-Sheet 2
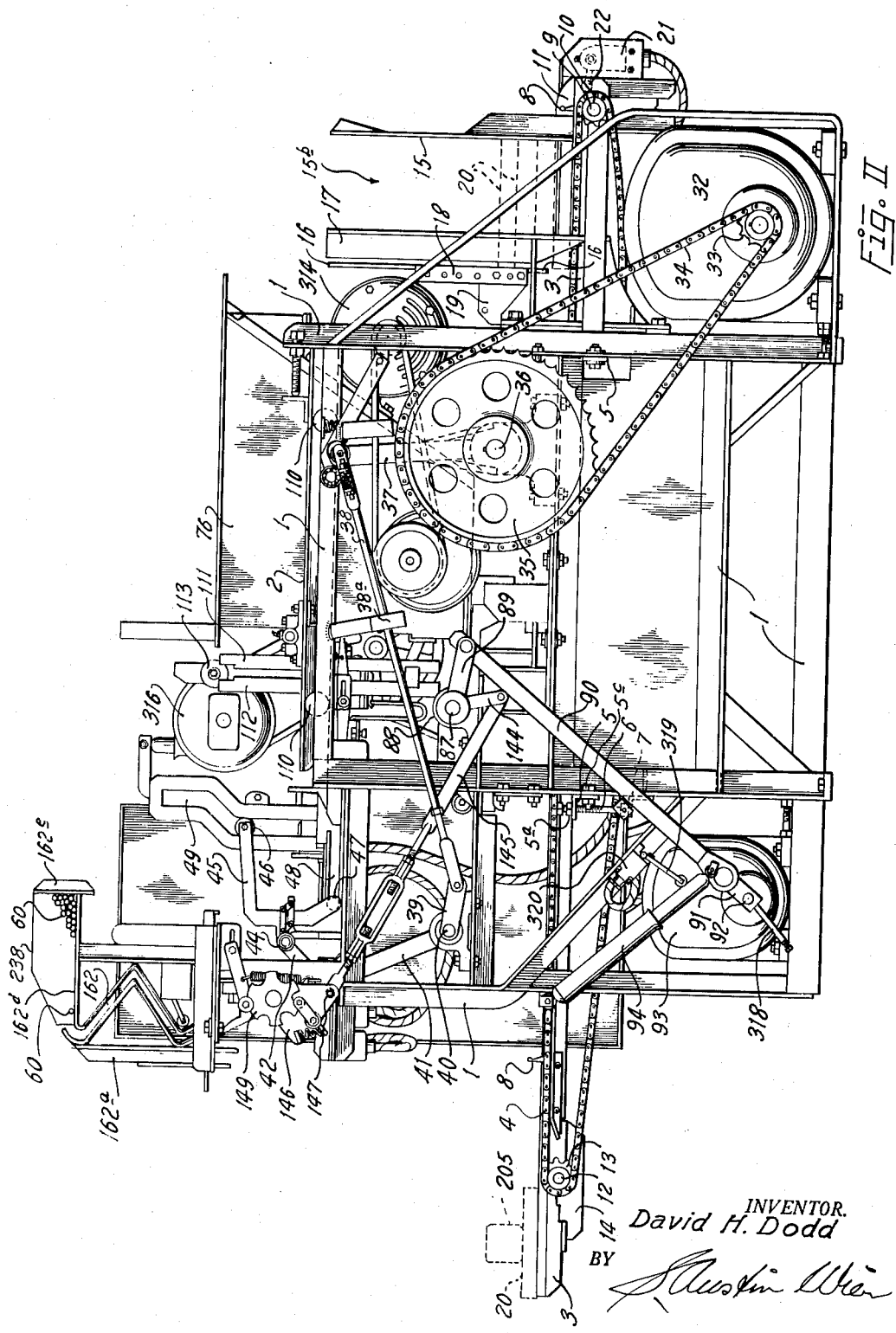
Fig. II
INVENTOR.
David H. Dodd
BY
ATTORNEY Jan. 31, 1956
D. H. DODD
2,732,607
METHOD FOR MAKING STRUCTURAL MEMBERS
Filed May 31, 1950
14 Sheets-Sheet 3
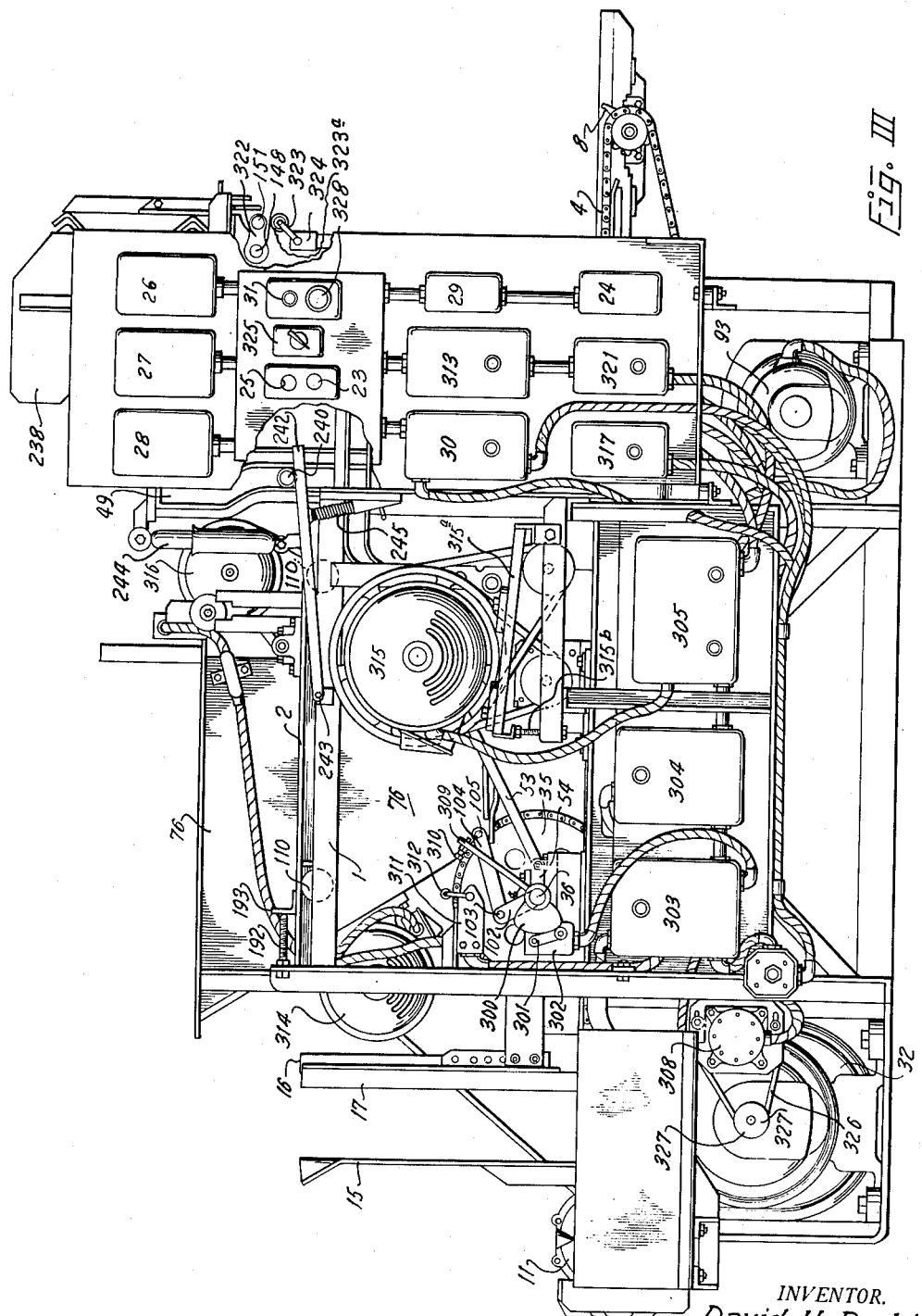
Fig. III
INVENTOR.
David H. Dodd
BY
ATTORNEY Jan. 31, 1956      D. H. DODD      2,732,607
METHOD FOR MAKING STRUCTURAL MEMBERS
Filed May 31, 1950      14 Sheets—Sheet 4
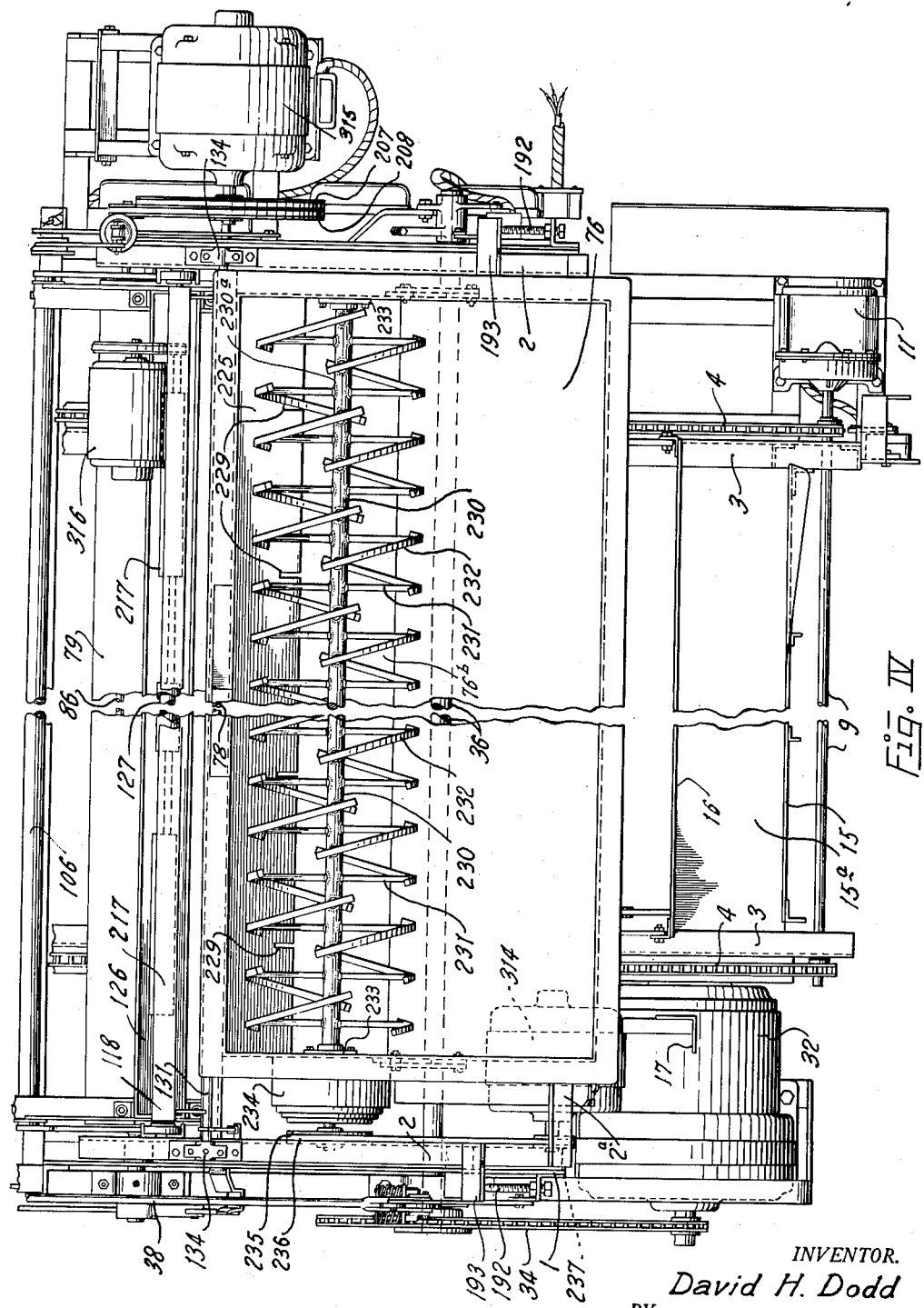
Fig. IV
INVENTOR.
David H. Dodd
BY
*ATTORNEY*

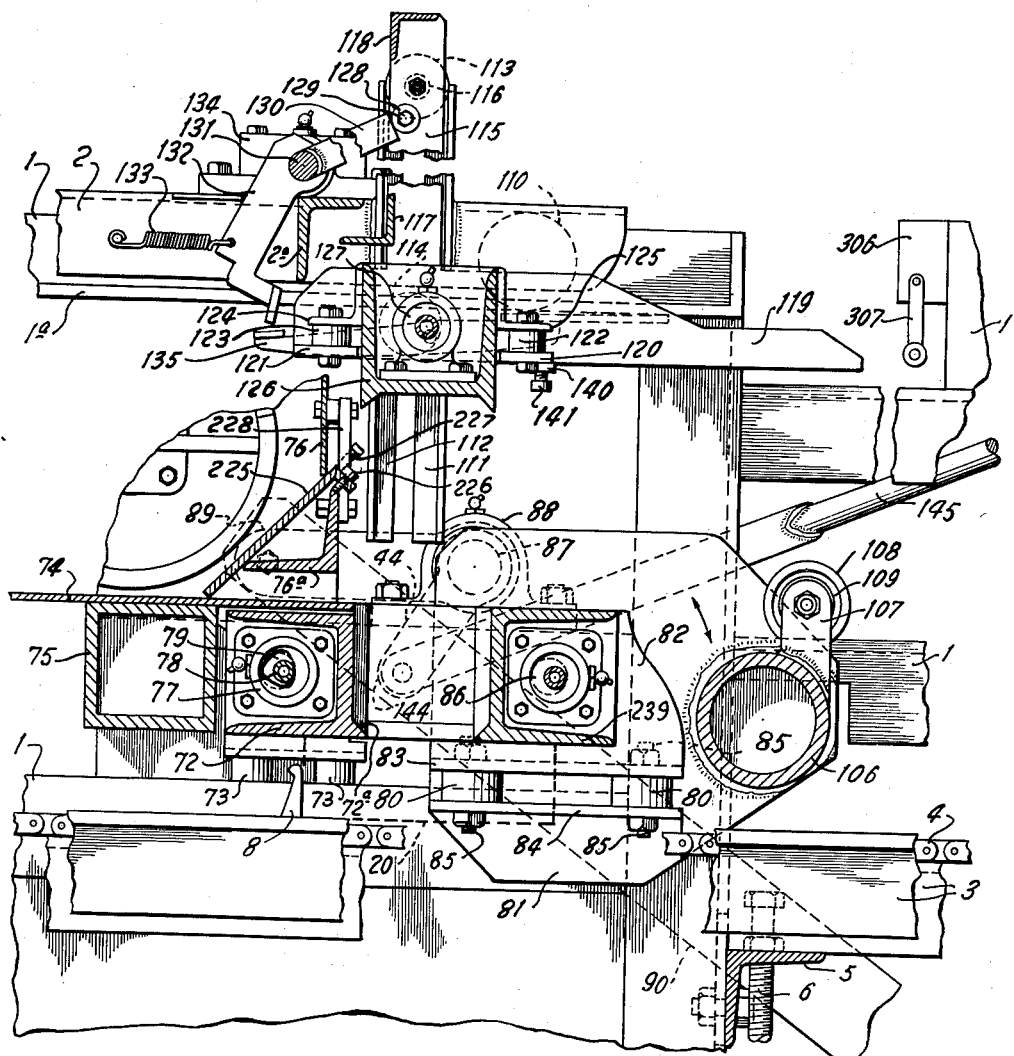
Fig. V

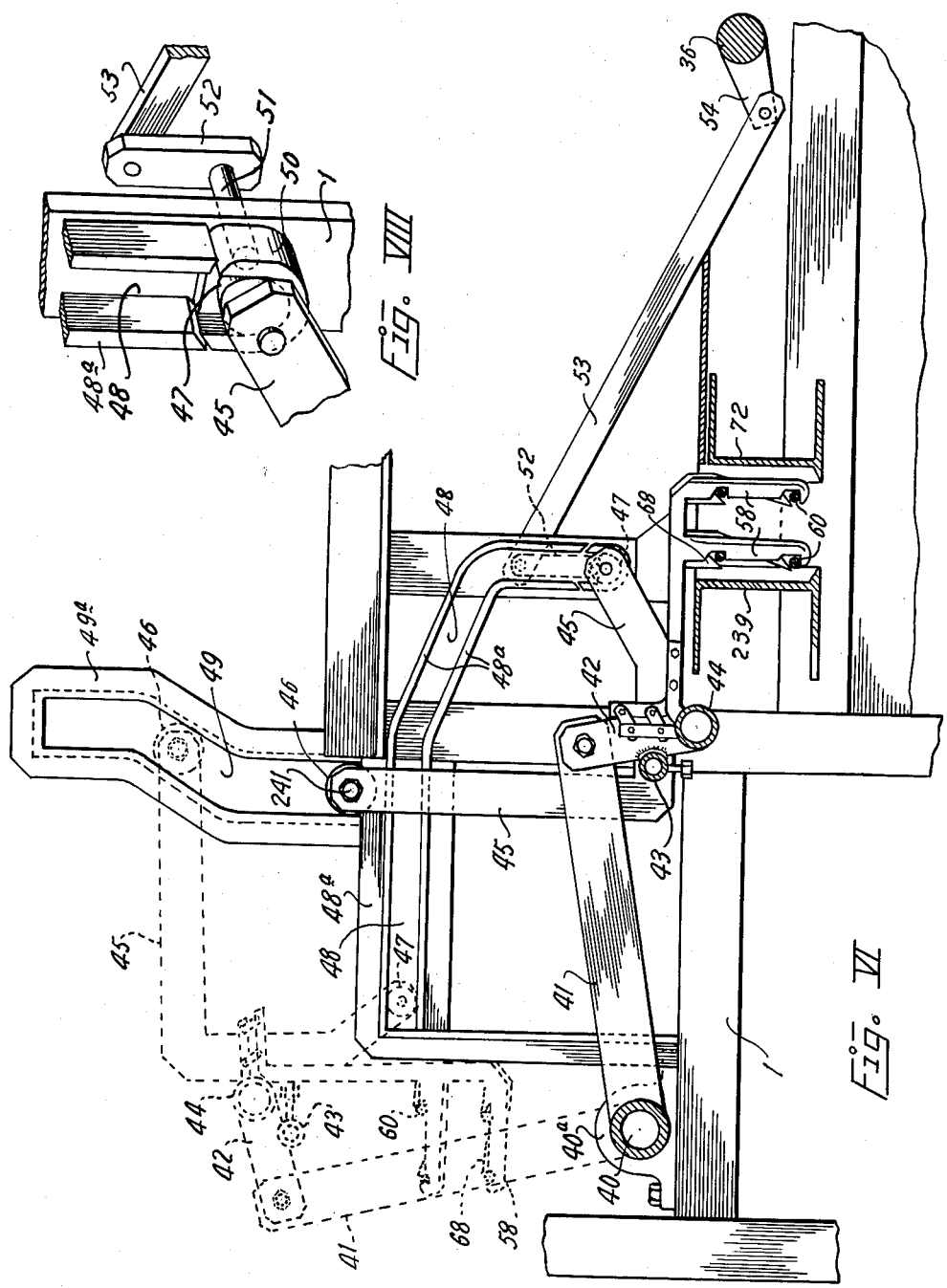

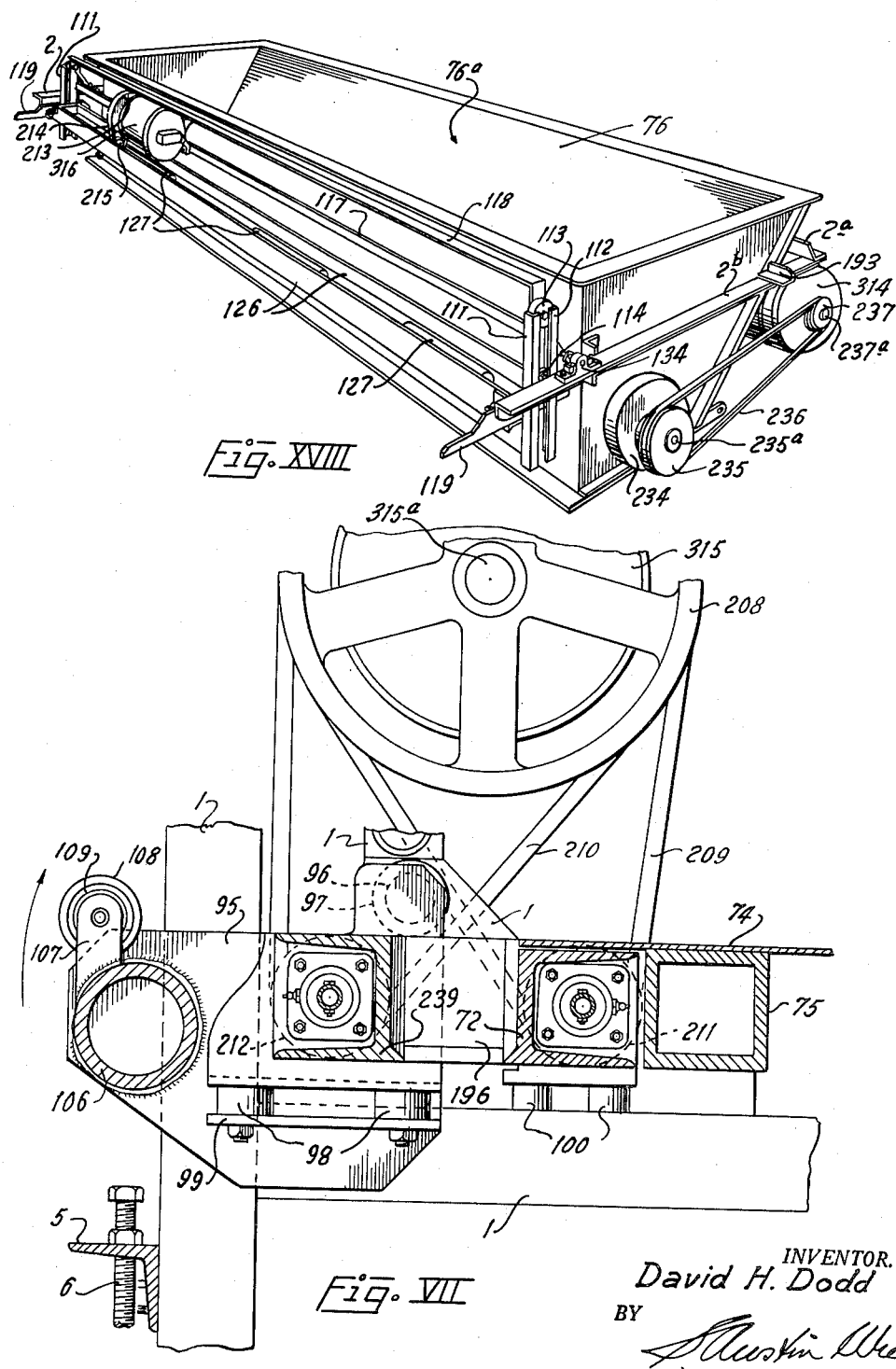

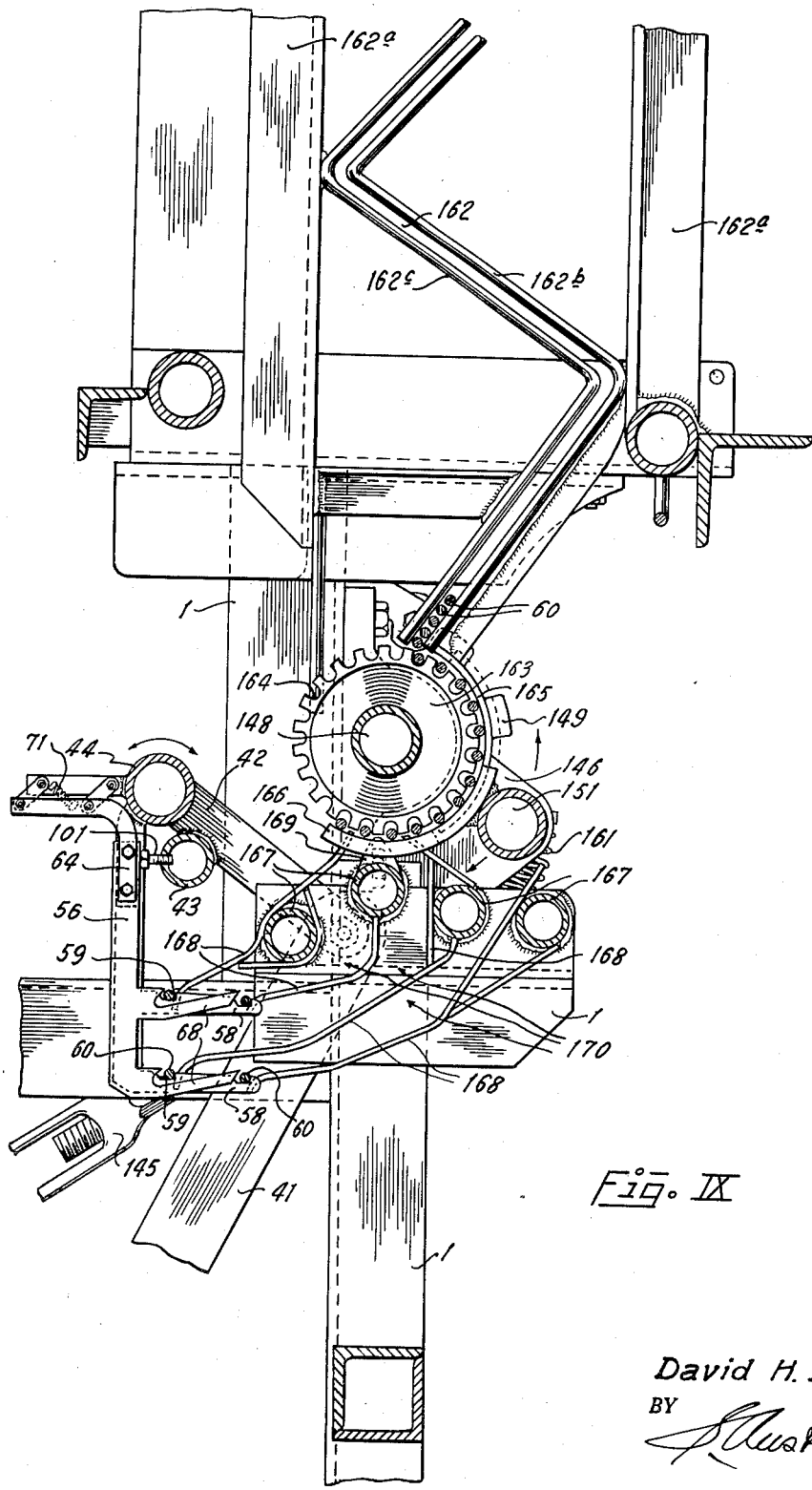
Fig. IX
INVENTOR.
David H. Dodd

Jan. 31, 1956 D. H. DODD 2,732,607
METHOD FOR MAKING STRUCTURAL MEMBERS
Filed May 31, 1950 14 Sheets-Sheet 9
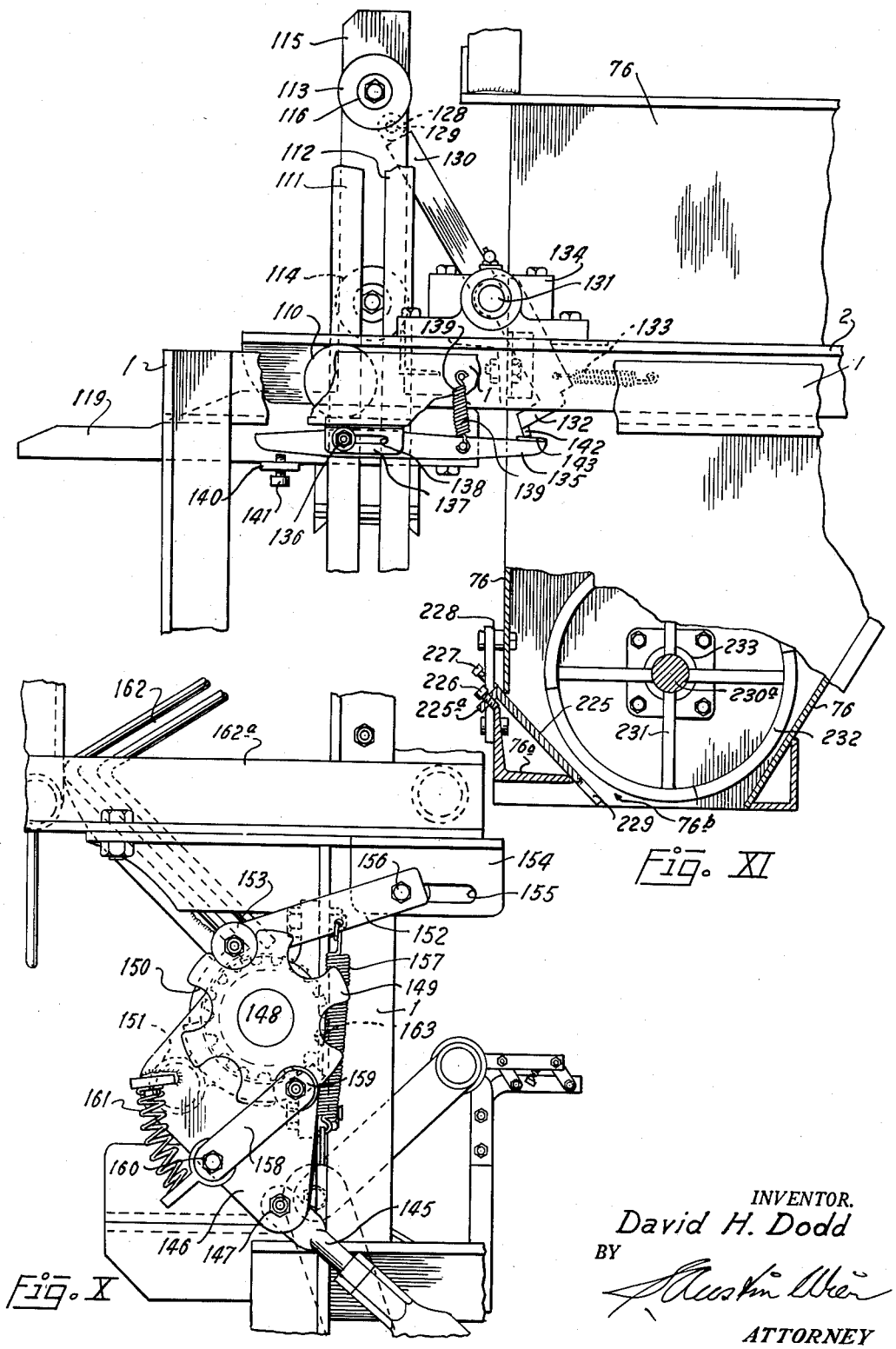
INVENTOR.
David H. Dodd
BY
ATTORNEY Jan. 31, 1956 D. H. DODD 2,732,607
METHOD FOR MAKING STRUCTURAL MEMBERS
Filed May 31, 1950 14 Sheets-Sheet 10
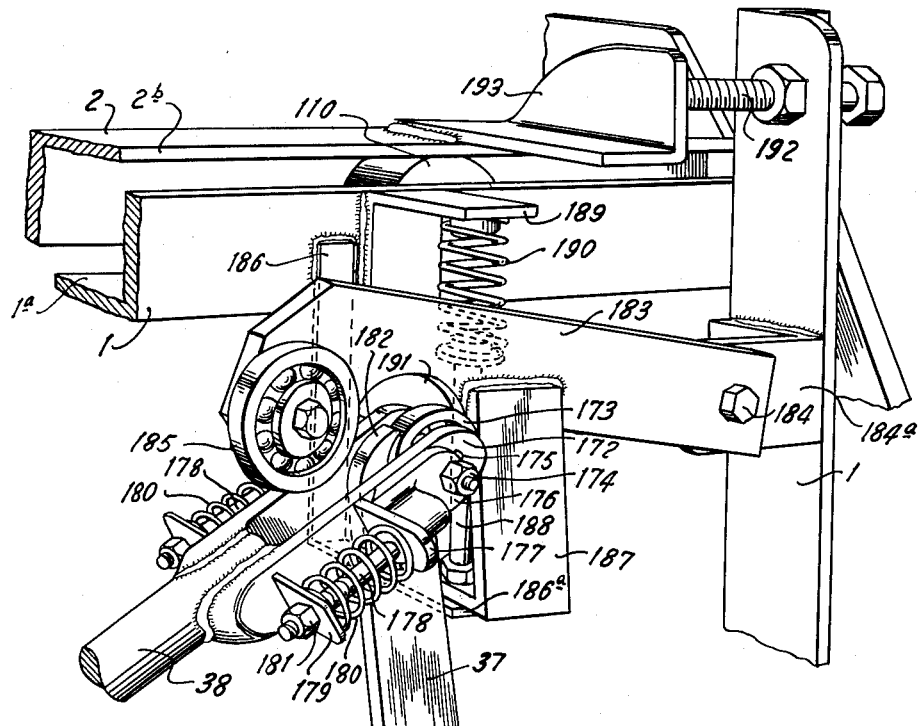
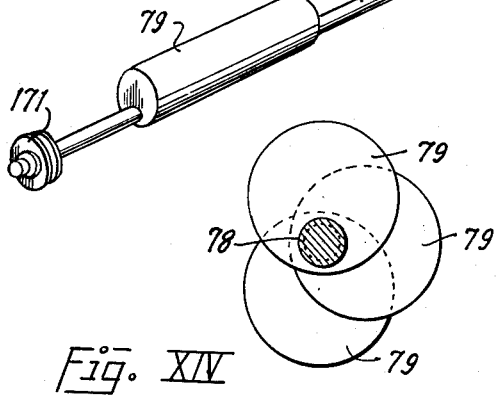
INVENTOR.
David H. Dodd
BY
ATTORNEY Jan. 31, 1956       D. H. DODD       2,732,607
METHOD FOR MAKING STRUCTURAL MEMBERS
Filed May 31, 1950                    14 Sheets-Sheet 11
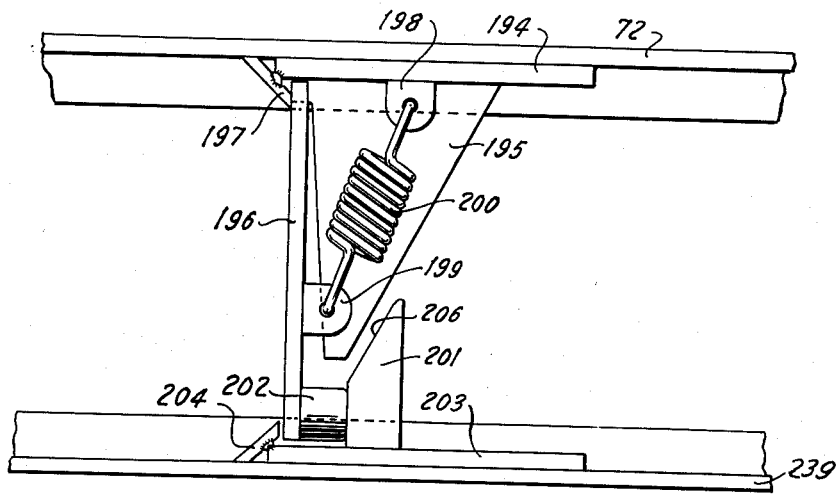
Fig. XV
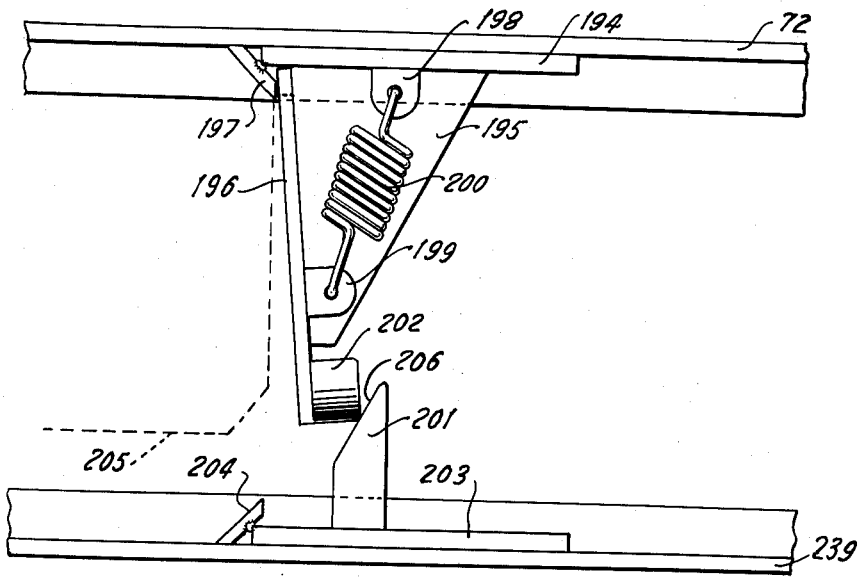
Fig. XVI
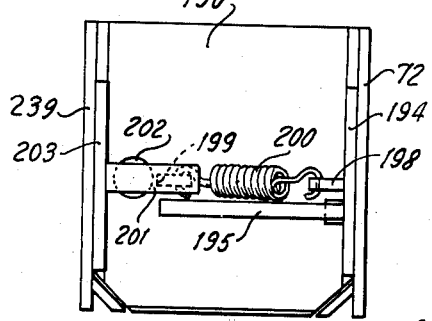
Fig. XVII
INVENTOR.
David H. Dodd
BY
ATTORNEY

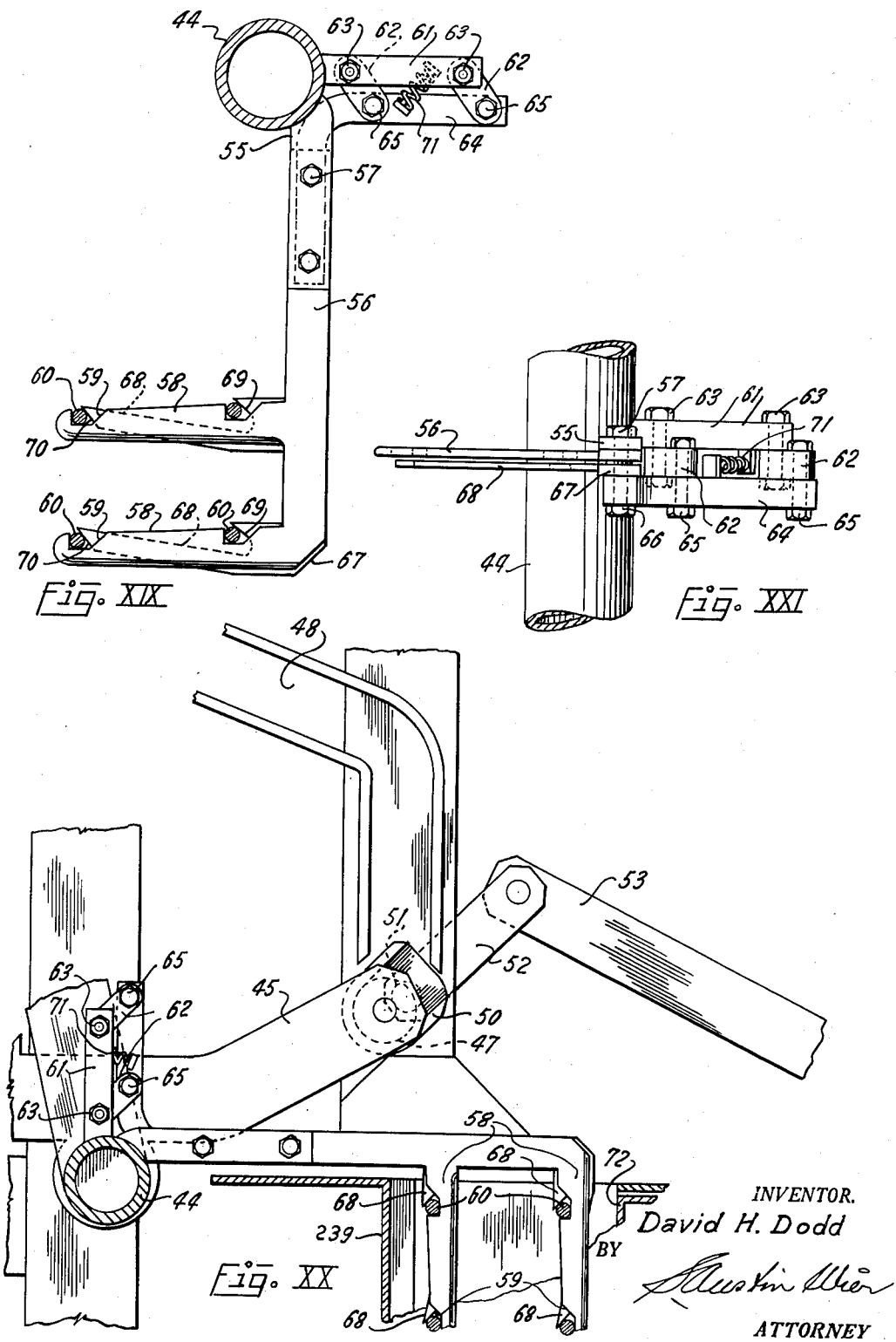

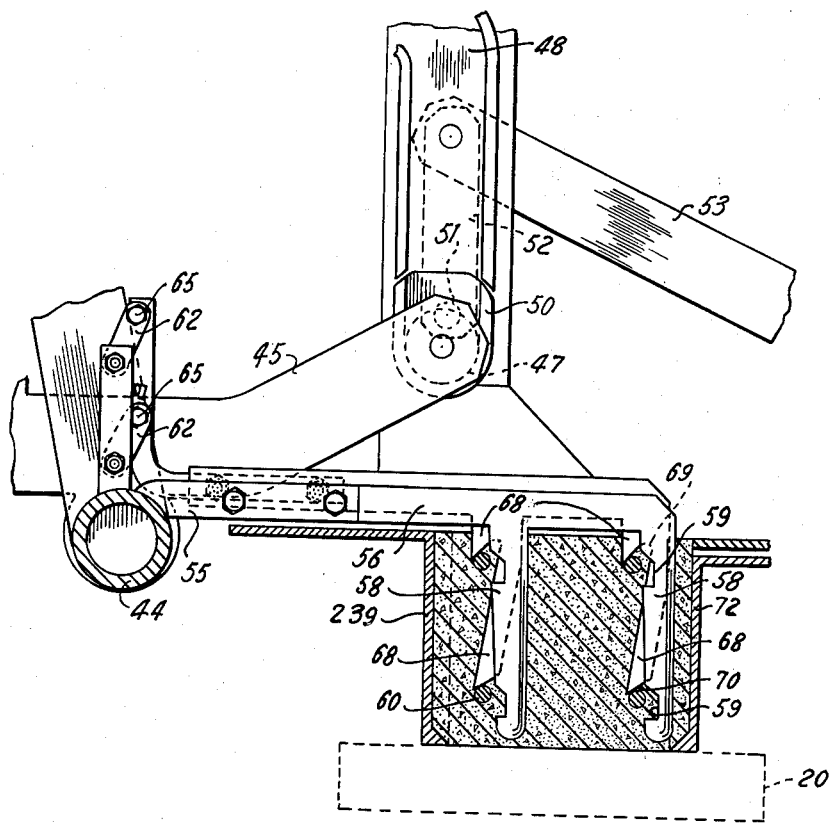
Fig. XXIII
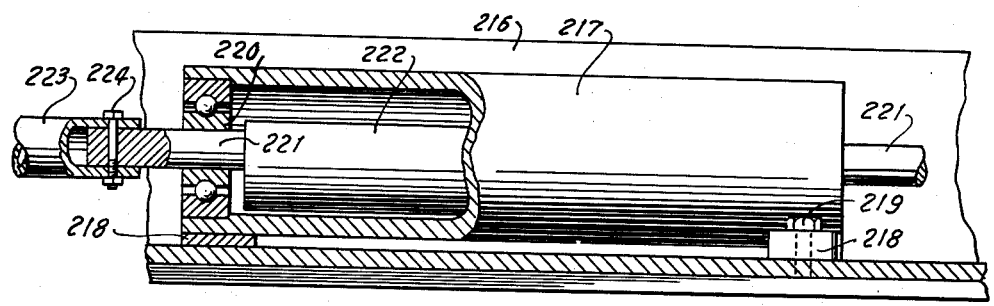
Fig. XXII
INVENTOR.
David H. Dodd
BY
ATTORNEY

Jan. 31, 1956  D. H. DODD  2,732,607
METHOD FOR MAKING STRUCTURAL MEMBERS
Filed May 31, 1950  14 Sheets-Sheet 14
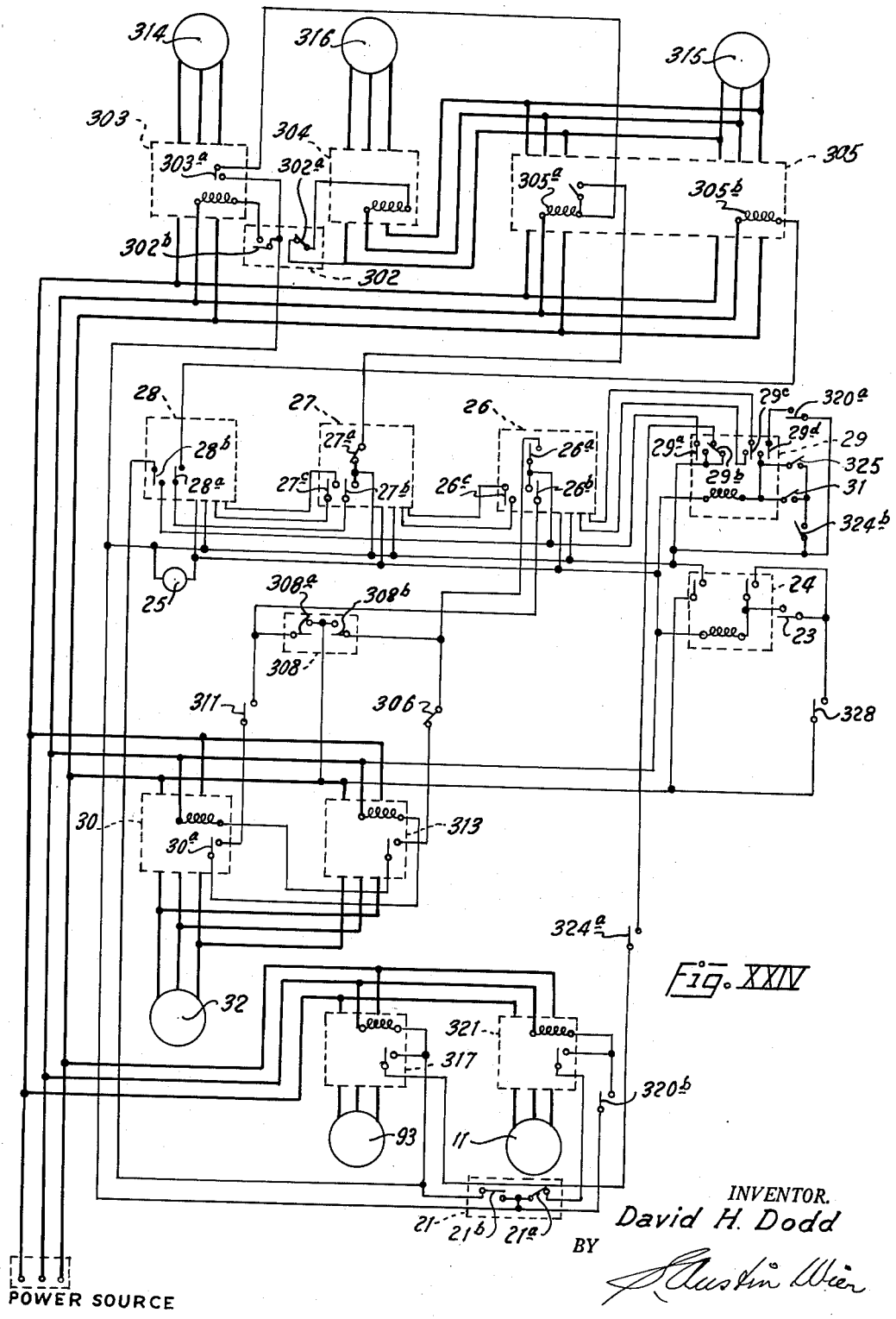
Fig. XXIV
INVENTOR.
David H. Dodd
BY
J. Austin Wier
ATTORNEY

| United States Patent Office | 2,732,607 |
|---|---|
| | Patented Jan. 31, 1956 |

2,732,607
METHOD FOR MAKING STRUCTURAL MEMBERS

David H. Dodd, Gallatin, Tenn., assignor of one-half to W. C. Windsor, Jr., Dallas County, Tex.

Application May 31, 1950, Serial No. 165,184

8 Claims. (Cl. 25—154)

This invention is concerned with method for manufacturing structural members of plastic materials, concrete or the like, such as posts, joists, columns, beams, slabs and such; and it is particularly concerned with a machine which, when energized and placed in operation, will automatically manufacture structural members of the type indicated with a minimum amount of labor and at a greater speed than has heretofore been accomplished by machine employed for this general purpose.

In the past various types of hand operated machines have been devised for the purpose of molding structural members from cement and aggregate, but such machines were necessarily slow in operation by reason of the fact that they were manually controlled and required the attention of a number of laborers. Furthermore, such machines did not incorporate the novel features and advantages of my invention hereinafter set out.

Such machine manufactured structural members were customarily molded from dry mortar, or a mix containing a relatively small amount of moisture, and it became necessary that the mortar be vibrated while in the mold in order to compact it so that it would set and hold its shape until it cured, after being removed from the mold.

It is often desirable that metal reinforcing rods, bars or the like, be placed in the mortar while it is in the mold, and the mortar be vibrated to compact it about the reinforcing members so that the mortar will assume its final disposition relative to the reinforcing members before the product is removed from the mold.

An important object of this invention is to provide a method of molding a structural member from mortar wherein reinforcing rods or other reinforcing members are placed in the mold before the mortar has been deposited in the mold, withdrawing the rod placing elements from the mold and vibrating the mortar with reinforcing members therein after the withdrawal of the rod placing members.

Another important object of my invention is to provide vibrators within the faces of the mold, each such vibrator being composed of a plurality of spaced vibrating masses, eccentrically disposed upon a common shaft, such vibrating masses being so disposed that the vibrating masses are progressively out of phase one with the next in their vibratory rotation, in order that the vibration of the mold face will take the form of a progressing wave passing along the length of the mold face, rather than vibrating the entire mold face in one motion, which would set up stationary harmonic nodes of no vibration along the mold face.

Another important object of my invention is to provide such vibrators wherein the shafts are journaled adjacent to each eccentric mass to transmit the particular phase relation of each mass to the mold at that point.

Still another object of my invention is to provide such vibrators wherein the vibrating masses are connected by hollow shafts, whereby the harmonic period of vibration in the connecting shafts is raised above the speed of rotation of the vibrating masses, so that harmonic vibrations will not be set up in the connecting shafts and the vibrators may be arranged to be rotated at any desired speed without setting up harmonic vibrations in the connecting shafts.

A still further object of my invention is to provide automatically operated reinforcing rod feeding fingers, to place a selected number of reinforcing rods in the mortar disposed in the mold, such fingers being provided with automatically operated retaining means thereon to hold the rods in place on the fingers while the fingers are moved to the mold and until the fingers are disengaged from the reinforcing rods and withdrawn from the mold automatically.

Other and further objects of my invention will become apparent upon reading the detailed specification hereinafter following, and by referring to the drawings attached hereto.

A preferred embodiment of my invention is shown in the attached drawings in which:

Figure I is a side elevational view of the machine seen from the side where the pallets are inserted.

Figure II is an end elevational view taken from the left side of Figure I.

Figure III is an end elevational view taken from the right side of Figure I.

Figure IV is a top plan view of the machine showing the auger in the hopper.

Figure V is a fragmentary cross-sectional elevational view taken along the line V—V of Figure I, showing the general mold assembly in section.

Figure VI is a fragmentary cross-sectional view taken along the line VI—VI of Figure I, showing a portion of the reinforcing rod placing mechanism.

Figure VII is a fragmentary cross-sectional elevational view of the mold assembly taken along the line VII—VII in Figure I.

Figure VIII is an enlarged perspective view of the pocket cam shown in Figure VI.

Figure IX is a fragmentary cross-sectional elevational view of the rod feeding mechanism taken along the line IX—IX of Figure I.

Figure X is a side elevational view of the rod feed ratchet.

Figure XI is an end elevational view (partially cut away) of the latching mechanism for releasably holding up the top mold assembly, wherein there is also shown a fragmentary cross-sectional elevational view of the cement hopper showing the auger positioned therein.

Figure XII is a perspective view of the connection between the rod placing arm and the rod placing link.

Figure XIII is a perspective view of a typical vibrator used in the machine.

Figure XIV is a diagrammatic view showing the relative position of the vibrators on the supporting shaft therefor.

Figure XV shows a top plan view of a typical end of the mold in closed position.

Figure XVI shows a top plan view of a typical end of the mold in open position.

Figure XVII shows an end elevational view of a typical end of the mold.

Figure XVIII is a perspective view of the hopper mounted upon its carriage.

Figure XIX is a side elevational view of a typical rod holding finger showing a typical finger guard which retains the rods in the fingers.

Figure XX is an enlarged side elevational view of the bucket cam shown in Figure VI, showing the operation thereof.

Figure XXI is a side elevation of the finger assembly taken from the right side of Figure XX.

Figure XXII is an enlarged side elevational view, partially cut away, showing detailed construction of a typical vibrating unit within its housing.

Figure XXIII is a side elevational view of the rod carrying fingers within the mold after they have been pulled away from the rods.

Figure XXIV is a schematic view of a suitable electrical circuit employed in operating the machine.

Numeral references are employed to designate the various parts of my invention shown in the drawings, and like numerals are used to designate like parts throughout the various figures of the drawings.

The numeral 1 designates the general stationary frame on which the various elements and parts of the machine are supported and carried. This numeral broadly designates all stationary members of the supporting frame, whether they be upright members or horizontal members.

The numeral 2 designates a moveable carriage frame on which the mortar containing hopper is carried and moved back and forth over the mold. The cross beams 2a, of which there is one at each end of the carriage frame 2, connect and hold in alignment the sides of the carriage frame 2.

The pallet carrying rails 3, of which there is a plurality (there being four in a typical machine), may be made of angle members, and they are arranged in spaced parallel relation, extending from one end of the machine to the other. The pallets 20 which may be made of wood, metal or other suitable material, extend between and rest upon the tops of the pallet carrying rails 3, and they slide thereon as the pallets are moved therealong by the pallet carrying chains 4.

The cross beams 5, which may be of angular cross-section, support the pallet carrying rails. There are two of these cross beams, one near each end of the machine, suitably arranged in spaced relation to support the pallet carrying rails 3. The ends of the cross beams 5 are slideably attached to upright members of the main frame by means of a slot like that shown at 5b in Figure I, and by means of a bolt 5c passing through the slot and the cross beam 5. A screw jack 6 is arranged at each end of each of the beams 5. The lower end of each of the screw jacks 6 rests upon a suitable metal clip 7 attached to the main frame of the machine. The screw jack threadedly extends through a nut 5a secured to the end of the cross beam 5. The screw jacks 6 allow for the adjustment in height of the pallet carrying rails 3 to accommodate different sizes of molds which may be employed in the machine.

A plurality of upwardly extending lugs 8 are attached to chains 4. The lugs 8 are arranged in transversely aligned pairs, one lug of each pair being attached to a separate chain 4 carried at each side of the machine. When a pallet 20 is deposited upon the pallet carrying rails 3, a pair of lugs 8 will engage the back edge of the pallet as the chains move and thereby push the pallet along the rails. There are two of the chains 4 arranged in spaced relationship, one at each side of the machine, each of them being supported by and slideable along an outermost pallet carrying rail 3.

Driven shaft 12, rotatably disposed at the delivery end of the machine, has a sprocket 13 mounted on each end thereof, about which sprockets the pallet driving chains 4 are disposed. The drive shaft 9, rotatably disposed at the entry end of the machine, has a sprocket 10 attached to each end thereof about which the pallet driving chains 4 are disposed. The electric motor 11 has its shaft connected to the shaft 9 and rotates it, and the sprockets 10 drive the shaft 12 and the sprockets 13 and the chains 4.

The tension of the chains 4 may be adjusted by means of a longitudinally adjustable plate 14, arranged at each side of the machine, on which the opposite ends of shaft 12 are rotatably carried.

The outer wall 15 of the pallet magazine 15b is secured to the pallet rails 3, and floor 15a of the pallet magazine has its opposite ends attached to the inner sides of the outermost rails 3 (see Fig. IV) and rests upon the interior rails 3. The inner wall 16 of the pallet magazine is attached to the main frame of the machine.

A stop 17 is provided at the end of the pallet magazine for the purpose of limiting the endwise insertion of pallets in the magazine, and to align them and retain them in the magazine. The stop 17 is attached to the main frame of the machine outside of the chain 4.

The pallet magazine above described is arranged to receive a plurality of pallets 20 from which magazine pallets are automatically fed upon the pallet carrying rails 3 when a pair of lugs 8 engage the ends of the lowermost pallet in the magazine and pushes it upon the rails. All of the pallets 20, except the bottommost, are restrained from forward movement by the inner wall 16.

An adjusting strip 18 has a plurality of adjusting holes therein and is attached to the inner wall 16 of the pallet magazine. Such strip is adjustably secured to the main frame of the machine by means of an attaching plate 19, which also has a plurality of holes therein arranged to correspond with holes in the adjusting strip 18, whereby the inner wall 16 may be adjustably raised or lowered by matching different holes in the plate 19 and the strip 18 to correspond with the vertical adjustment in height of the pallet carrying rails 3 to accommodate different sizes of molds which may be employed in the machine.

A limit switch 21 is secured to the rail 3 of the machine and has an arm 22 thereon. When one of the lugs 8 strikes the arm 22, the switch 21 is opened and the motor 11 is deenergized and stops the rotation of the chains 4. The motor 11 is also attached to the rails 3.

The pushbutton switch 23 energizes the machine. See Fig. III. When the switch 23 is momentarily closed, the relay 24, having a holding circuit therein, is energized, and the pilot light 25 is energized, indicating that the machine is in operation.

When the relay 24 is thus energized, the vacuum tubes in the time delay relays 26, 27 and 28 are energized through the relay 24.

The pushbutton switch 31, when energized, actuates the relay 29, thus supplying power to the starting relay 30 through contact 26a in relay 26 and through the limit switch 30b. The carriage travel motor 32 is therethrough energized and started.

A sprocket 33 (see Fig. II) is attached to the shaft of the motor 32, which sprocket drives a chain 34. The chain 34 drives a sprocket 35, which sprocket 35 is secured to the carriage shaft 36, and therethrough the carriage shaft 36 is rotated by the motor 32.

The rod placing arm 37 has its lower end attached to the shaft 36, and is adapted to move in response to the rotation of such shaft.

The rod placing link 38 is detachably secured to the outer end of rod placing arm 37. The other end of such link 38 is operatively attached to the rod placing shaft 40 through the crank arm 39, so that the crank arm 39 may be rotated through such linkage and therethrough the shaft 40 may be rotated.

As best shown in Fig. VI, the crank arm 41 which is duplicated at each end of the machine, is attached to the shaft 40 and is operated therethrough.

The opposed ends of the shaft 40 are rotatably mounted on horizontal side members of main frame 1 by means of suitable bearings 40a.

The link 42 is duplicated at each end of the machine and the outer end of each such link is pivotally attached to the outer end of one of the crank arms 41. The torque tube 43 is secured between the links 42 on each end of the machine and serves the purpose of holding the said links in alignment and in parallel relation.

The finger supporting bar 44 which, as shown, takes the form of a tubular member, extends substantially from one end of the machine to the other parallel to the rod placing shaft 40 and supports the rod placing finger assemblies, a plurality of which finger assemblies are spaced along its length. Such finger assemblies will be described in detail hereinafter.

The L-shaped roller carrying arm 45 is secured to the end of the bar 44 and is adapted to move therewith, one such bar 44 being rotatably attached to a link 42 at each side of the machine.

Roller 46 is rotatably attached to the upper end of the L-shaped arm 45; and the roller 47 is rotatably attached to the end of the outwardly extending leg of the arm 45.

Roller 47 is adapted to follow a guide slot 48, which slot is defined by side members 48a secured to the main frame of the machine; and the roller 46 falls in and follows a guide slot 49, which guide slot is defined by side members 49a secured to the main frame of the machine.

The lower end of the guide slot 48 terminates in a separate U-shaped moveable bucket cam 50. The shaft 51 is rotatably disposed through an upright support attached to the main frame of the machine, and the inner end thereof is secured to one leg of the bucket cam 50. The center line of the roller 47, where it is journaled to the arm 45, is located below the center line of the shaft 51 (Fig. VIII) so that when shaft 51 is rotated after the roller 47 has entered the bucket cam 50, as shown in Fig. VIII, such bucket cam may be pivotally moved to the position shown in Fig. XX, and the roller 47 is displaced to the left, as in Figures VIII and XX, together with the arm 45 for the purpose which will be hereinafter explained.

The crank arm 52 has its upper end pivoted to the connecting link 53 and its lower end is secured to the shaft 51 for the purpose of rotating such shaft through the connecting link 53. The connecting link 53 is operatively connected to the shaft 36 through the lower crank arm 54 (Fig. VI); and the link 53 is adapted to be actuated through the rotation of the shaft 36, such shaft being driven by the carriage motor 32.

At the starting point of a cycle of operation of the machine, the rod supporting fingers 58 are in the position shown in broken lines in Fig. VI; and such fingers were loaded with rods 60 during the previous cycle of operation. As the motor 32 turns, the shaft 36, through the links 37, 38 and 39, rotates the shaft 40 clockwise and, operating through arm 41 attached thereto, brings the L-shaped roller carrying arm 45 downward and causes the rollers 46 and 47 to follow their respective slots 49 and 48 to the position shown in solid lines in Fig. VI, thereby placing the fingers 58, with the rods 60 thereon, within the mold.

A checking mechanism is provided to bring the movement of the rod placing mechanism to a cushioned stop at the end of its aforesaid movement.

A rubber block 240 is attached to the end of the bolt 241, which bolt also rotatably attaches the roller 46 to the end of the arm 45. (See Fig. III and Fig. IV.)

In the downward travel of the rubber block 240 with the rod feed mechanism it strikes the arm 242 which arm is pivoted to the main frame by the pivot bolt 243. A hydraulic cylinder 244 is pivotally attached to the main frame at its upper end and is pivotally attached to arm 242 at its lower end so as to cushion the downward movement of the rod feed mechanism. On the raising of the rod feed mechanism the spring 245, attached between the main frame and the arm 242, urges the arm 242 back to starting position.

After such position shown in Fig. VI is reached and the roller 47 has come to its position in the bucket cam 50, as shown in Fig. VIII, the continued rotation of the shaft 36 causes the arm 37 to leave the link 38 in the manner which will be hereinafter described, and this allows the continued movement of the link 53 and thereby rotates the shaft 51 and turns the bucket cam 50 about to the position shown in Fig. XX, for the purpose explained hereinafter.

Referring now to Fig. XIX, the lug 55 is attached to the finger supporting bar 44, and the finger supporting arm 56 is secured to the lug 55 by means of bolts 57. The rod supporting fingers 58 are integrally attached to the finger supporting arm 56; and such rod supporting fingers have recesses or slots 59 therein in which the reinforcing rods 60 may be disposed in substantially parallel spaced relation.

There is provided a plurality of the finger assemblies described above, spaced along the length of the finger supporting bar 44, there being four of such assemblies employed in a typical machine. Such finger assemblies are in alignment and the slots 59 therein are in alignment so that the rods 60, disposed thereon, are supported in substantially parallel relation.

The stud 61 is secured to the bar 44 and the links 62 are pivoted to such stud by means of the pivot bolts 63.

Finger guard supporting bracket 64 is pivotally attached to the ends of links 62 by means of pivot bolts 65.

Bolt 66 connects the bracket 64 with the finger guard arm 67 (Fig. XXI). Finger guards 68 are integrally attached to the finger guard arm 67 and have inwardly tapered recesses 69 therein and tapered outer ends 70 thereon.

Spring 71, secured between finger guard supporting bracket 64 and stud 61, normally urges finger guards 68 into engagement with the reinforcing rods 60, as shown in Fig. XIX. The finger guards thus hold the rods in the recesses or slots 59 on the fingers 58 while the rods are being carried to the mold, but such finger guards are released from the rods in the mold in the manner which will be hereinafter described.

At the beginning of a cycle of operation of the machine, the carriage 2, and the hopper 76 carried thereby, are in retracted or starting position, as shown in Fig. III. The rod placing fingers and the carrying mechanism therefor are also in retracted position, as indicated in broken lines in Fig. VI and by full lines in Fig. IX. The rod carrying fingers 58 are in position, underneath the rod feeding mechanism described in connection with Fig. IX, to receive reinforcing rods 60; and the finger guards 68 are in open position, as shown in Fig. IX, by reason of the stud bolt 101 in the torque tube 43 pressing against the finger guard supporting bracket 64 and thereby pushing the finger guards 68 backward against the tension of the spring 71. While the finger guards are in such retracted position the reinforcing rods 60 are fed to their respective positions on the fingers 58.

When shaft 40 is rotated clockwise, in Fig. VI, through the linkage of arm 37, link 38 and arm 39, the rollers 46 and 47 are caused to follow their respective guide slots 49 and 48, causing a counterclockwise rotation of the finger supporting bar 44, which bar rotates in the end of the link 42. The counterclockwise rotation of the finger supporting bar 44 in Fig. VI (clockwise in Fig. IX) causes finger guards 68 to close by reason of the finger guard supporting bracket 64 leaving the stud 101, allowing spring 71 to retract and close the finger guards into engagement with the rods 60.

By the clockwise rotation of the shaft 40, as aforesaid, the rod carrying fingers are carried downward to their position in the mold, as shown in full lines in Fig. VI. As the hopper carriage rolls forward, the bucket cam 50 changes from the position shown in Fig. VIII to the position shown in Fig. XX. Such rotation of the bucket cam 50 is made possible by the further rotation of the shaft 36 after the finger placing mechanism has completed its movement. Further rotation of shaft 36 is permitted by the disconnection of arm 37 from link 38 through the detachable linkage therebetween, hereinafter described. The further rotation of shaft 36 actuates link 53 and turns the bucket cam.

As the carriage moves backward after depositing mortar therefrom into the mold, the bucket cam 50 is rotated back to the position shown in Figure VIII, after which the hook 182 on arm 37 engages with roller 173 on link 38 and again brings arm 37 and link 38 into engagement. At this point the rod carrying fingers 58 have moved from the position shown in Figure XX to the position shown in Fig. XXIII by the rotation of bucket cam 50. Such rotation of the bucket cam to the position shown in Fig. XXIII pulls arm 45 downward and to the right carrying along with it finger supporting bar 44 and fingers 58 attached thereto, thereby pushing fingers 58 backward and downward away from rods 60.

The mortar in the mold restrains the movement of the rods 60 while the fingers are thus pulled away from them. When the fingers are thus moved away from the rods, the finger cover guards 68 are prevented from moving by reason of the fact that rods 60 are engaging the tapered sides of the recesses 69 and the tapered outer end 70 thereon. The restraint of the finger guards causes pivot bolts 65 to maintain their same relative horizontal position while the aforesaid movement of the fingers 58 causes link 62 to rotate about the pivot bolts 65. Further rotation of the shaft 40 counterclockwise, as in Fig. VI, lifts the rod carrying fingers and the guards therefor straight up out of the mold. The finger guards 68 are momentarily held down against the reinforcing rods by the tension of spring 71, but when the tension of spring 71 is exhausted by the lifting of the rod carrying fingers, the finger guards are also pulled out of the mold with the fingers. The fingers and guards are then rotated back to starting position, as shown in broken lines in Fig. VI, in position to begin another cycle of operation. The rods 60 are left in the mortar in the mold.

The stationary mold face 72 (Fig. V) is channel-shaped and has an outwardly tapered lower side 72a provided on the front face thereof for the purpose of making a chamfer on the corner of the post or other structural member formed in the mold. Mold face 72 is attached to and extends between horizontal side members of the main frame of the machine and extends substantially the width of the machine. It is spaced from the mounting members therefor by means of rubber blocks 73 at each end of the mold face. Such blocks are provided for the purpose of absorbing the vibration of the walls or plates which form the mold when the vibrators therein are activated; and such arrangement prevents the vibration from being transferred to the frame of the machine.

A plate 74 is secured to the upper side of the box member 75. Such box member extends the length of the mold face 72, and is attached at its ends to the main frame of the machine. Plate 74 extends the full length of the mold face 72 and of the box member 75, and it extends over the top of the stationary mold face 72 and terminates at the upper inner side thereof. Plate 74 closes the bottom of the hopper 76 as it moves therealong and prevents the mortar in the hopper from being discharged therefrom until the hopper reaches its position over the mold. After the hopper has cleared plate 74, the bottom thereof is open and mortar therein is allowed to be discharged into the mold.

The hopper 76 (Fig. XVIII) is a trough-like receptacle adapted to contain a large quantity of mortar from which a measured portion of mortar is deposited in the mold each time the hopper moves over the mold. It has an inclined front wall 76a, which slants downwardly toward the base, and the hopper is provided with an opening 76b at the bottom thereof, as shown in Fig. IV, through which opening the mortar is deposited in the mold when the hopper has moved forward to bring the opening over the open mold in the manner which will be described in more detail later. The construction and operation of the hopper and auger therein will also be described in detail later.

A vibrator is disposed within the stationary mold wall or face 72. A suitable vibrator may be composed of a plurality of eccentric masses 79 connected together by hollow shafts 78 (see Fig. XIII). Each of the vibrating masses is eccentrically arranged upon shaft 78 and each is disposed out of phase in its rotation with the other vibrating masses disposed upon the same shaft. Each such vibrating mass 79 is disposed within a separate housing 77 and is rotatably carried within the housing by means of bearings. These bearings are placed within the ends of the housing through which the shafts, attached to the vibrating masses, pass.

The detailed construction and mounting of a typical vibrating mass is shown in Fig. XXII, in which the numeral 216 indicates a mold face or wall which is exactly the same in construction as the mold face 72 and is typical of the construction of the mold faces described herein, such mold faces being designated as 72, 239 and 126. The cylindrical housing 217 has four legs 218 thereon, two of which are disposed at each end of such housing. Legs 218 are secured to the bottom inner side of the mold face by means of stud bolts 219.

A ball bearing 220 is disposed in each end of the housing 217 through which a shaft 221, attached to each end of the vibrating mass 222, rotatably passes. The vibrator shafts 221 may be made integral with the vibrating mass 222. The shafts are journaled adjacent to each eccentric mass in order to transmit the vibrating phase relation of each mass to the mold at the location where the mass is disposed. A tubular shaft 223 is attached between the shafts 221 of adjacent vibrating masses, and such shaft 223 may be secured to the shaft 221 by means of bolt 224 passing therethrough.

The relative disposition of the vibrating masses on the mounting shafts therefor is shown in Figs. XIII and XIV. In such figures the vibrating masses 79 are eccentrically disposed upon their respective shafts, indicated as at 78, and such masses are so disposed that they are out of phase with each other in their rotation, as diagrammatically shown in Fig. XIV. Such disposition of the vibrating masses with relationship to each other causes them to have advancing phase relation, one with another, to prevent the setting up of stationary harmonic nodes along the vibrating mold, and this arrangement allows for the even vibration of the mortar within the mold.

The vibrating masses should be connected by hollow shafts like that shown as at 223 in Fig. XXII. The harmonic period of vibration of the hollow shafts is higher than that of solid rods and by the employment of such hollow shafts the harmonic period of vibration of the connecting hollow shafts between the vibrating masses is raised above the speed of rotation of the vibrating masses, the result being that the critical speed of rotation of the vibrating masses is higher than the rotating speed at which they are operated. This makes it possible for the vibrators to be rotated at any desired speed without setting up harmonic vibration within the connecting shafts, and allows for the uniform vibration of the motor within the mold.

An alternative form of vibrating elements to perform the same function as that described above may be made of a succession of uni-directional vibrating units, such as solenoids, arranged to progressively pulsate along the mold as would be the case of three such solenoids operated singly and in succession by the three phases of three phase alternating current; or such vibrating elements may take the form of a plurality of air or hydraulic cylinders operated singly and in succession along the mold by suitable valves.

The pivoting mold face 239 is exactly the same in construction as the stationary mold face 72 described above. This mold face forms one side or wall of the mold when it is in down position, as shown in Fig. V. It is adapted to be pivoted upward to provide clearance for the molded structural member to be conveyed out of the mold after it has been vibrated.

The pivot plate 81, which is substantially duplicated at each side of the machine, is secured to the torque tube 106. The torque tube 106 connects the pivot plates at each side of the machine and provides for their rotation in common.

A support plate 82 is affixed to the end of the mold 239, and thereby provides attachment of the mold face to the pivot plate 81. This support plate is substantially duplicated at each end of the pivoting mold face 239. The support plate 82 has an outwardly extending flange 83 provided thereon, and the pivot plate 81 has an inwardly extending flange 84 thereon. The rubber blocks 80 are disposed between the flanges 83 and 84 and are attached thereto by means of the bolts 85, on each end thereof, the heads of which bolts may be molded in the rubber blocks when made. Such rubber blocks absorb the vibration of the vibrator within the mold face 239 and prevent it from being transferred through the plate 81 to the frame of the machine.

The vibrator assembly 86 is disposed within the pivoting mold face 239, such vibrator assembly being the same in construction and operation as the vibrator assembly described above in connection with the stationary mold face 72.

A short shaft 87 is rotatably disposed within a ball bearing carried in the ball bearing pillow block 88, such pillow block being bolted to the main frame of the machine. A crank arm 89 operatively connects the shaft 87 with the link 90 (see Figs. II and V). The link 90 operatively connects the crank arm 89 with the crank arm 91, such crank arm 91 being attached to the shaft of the motor 93.

The motor 93 (Fig. II) has a drive shaft 92, which, by the rotation thereof, actuates the link 90 and the crank arm 89. Motor 93 operates the pivoting mold face 239 and the rod feed mechanism.

When motor 93 is energized, it moves the pivoting plate 81, through the crank arm 91, the link 90 and the crank arm 89, upward about the shaft 87, thereby raising the mold face 239 out of the way of the structural member moving out of the mold; and motor 93, through such linkage, also brings the mold face 239 down after the molded structural member has been conveyed from the mold.

The hydraulic shock absorber 94 is connected between the link 90 and the main frame of the machine and the opposition thereof prevents the motor 93 from coasting when it is deenergized, and thereby prevents the pivoted mold face 239 from starting back up after it has been brought down to molding position.

At the other side of the machine from that shown in Fig. V (see Fig. VII), the pivoted mold face 239 is attached to pivot plate 95 which substantially duplicates pivot plate 81. Such pivot plate 95 is secured to a stud shaft 96, which corresponds in function to that of shaft 87 at the other end of the machine. The stud shaft 96 is rotatably carried in a bearing 97, which bearing is attached to the main frame of the machine. The rubber blocks 98 are the same in construction as rubber blocks 80 and are disposed between the extension flange 99 on the pivot plate 95 and the underside of the pivoted mold face 239, such rubber blocks being provided to absorb vibration of the vibrator within the mold and prevent it from being transferred to the frame of the machine.

In Fig. VII is also shown rubber blocks 100 placed between the main frame of the machine and the underside of fixed mold face 72 to perform a like function as that of rubber blocks 73 at the other end of mold face 72.

Torque tube 106 is connected between pivot plates 81 and 95 at opposite sides of the machine and serves the purpose of holding them in alignment and providing for their actuation in common, and the raising and lowering of the pivoting mold face 239 carried thereby.

A bracket 107 is secured to torque tube 106 near the end thereof and extends upwardly therefrom, as shown in Fig. V, and roller 108 is rotatably carried by the upper end of bracket 107. Bracket 107 and roller 108 are duplicated at each end of torque tube 106.

When pivoted plate 81 is rotated upward in the manner hereinbefore described, the rollers 108 contact the underside of plates 119 and carry the top mold assembly upward until cam arm 130 pases roller 128 and drops underneath the same to thereby hold the top mold assembly up. The construction and operation of the top mold face latching and tripping assembly will be described in detail hereinafter.

The mortar hopper 76 is mounted on the carriage frame 2, such carriage frame being free to move back and forth.

A plurality of rollers 110, as shown in Figs. II, V, XI and XII, are arranged between upper flange 2b (on each of the horizontal side members of the moveable carriage frame 2) and flange 1a (on horizontal side members of the main frame 1), such flanges being oppositely extending to form a channel in which rollers 110 may roll. Rollers 110 are free running in that they do not have axles. Two of these rollers may be provided on each side of the machine, and the moveable carriage 2 rolls back and forth on such rollers.

Upwardly extending angle members 111 and 112 are attached to the hopper carriage frame 2 (see Figs. I, V, XI and XVIII) to form a channel in which rollers 113 and 114 may be guided and rotated, and such channel, together with the rollers 113 and 114, and the mounting therefor, are duplicated on each end of the hopper carriage.

Rollers 113 and 114 are rotatably disposed at opposite ends of the vertically slidable plate 115, which plate is adapted to slide up and down in the channels formed by the members 111 and 112 at each side of the machine, such rollers 113 and 114 being journaled to the plate 115 by means of ball bearings, such as that indicated at 116.

Angle beams 117 and 118 are secured between plates 115 at each side of the machine and hold such plates in alignment and in their respective guide channels.

The horizontally disposed plate 119, which is duplicated at each side of the machine, is attached to a vertically disposed plate 115 at each side of the machine, and such plates 119 are adapted to move the slidable plates 115 upwardly in their respective guide channels when the plates 119 are pushed upwardly with the raising of the pivoting mold face 239.

Brackets or studs 120 and 121 extend outwardly from and are attached to plates 119; and angle clips 124 and 125 are secured to opposite sides of the elevatable mold face 126. Rubber blocks 122 and 123 are secured between the stud 120 and clip 125 and the stud 121 and clip 124 respectively, such rubber blocks and mounting therefor being duplicated at each end of elevatable mold face 126. These rubber blocks are provided for the purpose of absorbing the vibration of the vibrator within the mold face 126 and preventing it from being transferred to the frame of the machine.

Elevatable mold face 126 is the same in construction as mold face 72, which was described in detail above. Vibrator 127 is disposed within the upper mold face 126, such vibrator being the same in construction and operation as the typical vibrator described above in connection with stationary mold face 72.

Roller 128 is journaled on the opposite side of slidable plate 115 from the rollers 113 and 114, by means of bolt or stud 129. Roller 128 is duplicated at the other side of the machine.

Latching cam arm 130 is secured to shaft 131, which shaft extends substantially the full width of the machine and has a latch like that indicated at 130 disposed near each end thereof. The ends of shaft 131 are rotatably carried in bearings like that indicated at 134, such bearings being attached to the sides of carriage frame 2.

The pivoting arm 132 has its upper end attached to shaft 131, and actuates such shaft in the manner which will be hereinafter described.

Spring 133 has one end attached to carriage frame 2 and the other end attached to arm 132, such spring operating to urge the lower end of arm 132 to the left, as shown in Fig. V, to thereby urge the latch 130 underneath the rollers 128, so as to hold the top mold face assembly up.

Every member indicated by numerals from 111 through 130 is duplicated at the opposed side of the machine.

When pivot plate 81 is swung upward, in the manner hereinbefore described, rollers 108 contact the under sides of horizontal plates 119 and roll therealong, thereby raising the top mold assembly upward from its position over the mold, the slidable plates 115 being pushed upward in their respective channels, and rollers 113 and 114 rotating in such channels, carrying with them rollers 128. When rollers 128 contact latches 130, such latches are rotated upward about shaft 131 against the tension of the spring 133. When rollers 128 pass latches 130, spring 133 causes such latches to drop underneath such rollers and the tension of such spring maintains contact of the latches with the rollers and thereby hold the top mold assembly up until it is tripped and allowed to fall in the manner which will be hereinafter described.

Latch 135 is provided for the purpose of tripping the top mold assembly to allow it to fall upon the mortar in the mold in the manner which will be hereinafter described.

The tripping latch 135 is pivoted to a bracket 137 by means of a pivot bolt 136, the bracket 137 being secured to the main frame of the machine (Fig. XI). A slot 138 is provided in bracket 137 for the purpose of allowing horizontal adjustment of latch 135.

Spring 139 is connected between latch 135 and the main frame of the machine, such spring being provided to urge the end of the latch to the right of the pivot point upward, as shown in Fig. XI.

An outwardly extending bracket 140 is secured to the under side of horizontal plate 119, and an adjustable screw 141 is carried in such bracket. The inner or upper end of screw 141 is adapted to strike the underside of latch 135 and thereby turn it about pivot bolt 136, when the plate 119 is raised, by the raising of the pivoting mold face 239, in the manner hereinbefore described.

When carriage 2, having hopper 76 mounted thereon, moves forward, and to the left as shown in Fig. XI, the arm 132, being carried thereby, moves with it and the extension 142 thereon goes past the extension 143 on latch 135 and allows the right end of latch 135 to rotate upward by reason of the tension of spring 139. When thus released, the right end of latch 135 strikes the under side of the horizontal side member of the main frame of the machine which limits its upward movement.

When the carriage is reversed and moves in the opposite direction until near the end of its reversed travel, then the extension 142 on arm 132 engages extension 143 on latch 135, thereby rotating shaft 131 counterclockwise, as in Fig. V, and clockwise as in Fig. XI, and pulls the cam arms 130 upward and out of engagement with the rollers 128 and, such operation permits the top mold assembly to drop in place over the mortar in the mold.

When pivoted plate 81 rotates and raises the top mold assembly in the manner hereinbefore described, the rollers 128 go past the arms 130 (being held in raised position by the engagement of the extensions 142 and 143 on the arms 132 and 135 respectively) more than enough to allow arms 130 to fall underneath rollers 128 when such arms are released by screw 141 engaging and pushing upward on the end of the latch 135. This operation releases the engagement of extensions 142 and 143, whereupon the retraction of the spring 133 pushes arms 130 underneath the rollers 128 and thereby latches the top mold assembly in raised position; and it remains so latched when the pivoting plate 81 is returned to its lowered position.

Referring to Figs. II and X, the crank arm 144 is affixed at one end to the shaft 87, and the outer end thereof is pivotally connected to one end of link 145; and the opposite end of link 145 is pivotally attached to the rod feed ratchet end plate 146 by means of pivot bolt 147.

The ratchet wheel 149 is affixed to shaft 148, which shaft extends substantially the full width of the machine. This wheel has a plurality of spaced recesses 150 arranged between the peripheral teeth thereon. End plate 146 is journaled about shaft 148.

Torque tube 151 is attached to and extends between end plate 146 and arm 322, which is on the other side of the machine (Fig. III). Such torque tube spaces and holds end plate 146 and arm 322 in alignment.

Upper ratchet arm 152 has a roller 153 rotatably mounted at the outer end thereof, and the other end thereof is pivotally mounted to the bracket 154, such bracket being attached to the main frame of the machine. An adjustment slot 155 is provided in the bracket 154 for the purpose of adjusting the pivot pin 156 laterally in such slot.

Spring 157 is attached between arm 152 and the main frame of the machine, and it urges roller 153 into engagement with the ratchet wheel.

Lower ratchet arm 158 has a roller 159 rotatably disposed on the inner end thereof, and such arm is pivoted to the end plate 146 by means of a pivot bolt 160. Compression spring 161 is attached between the outer end of arm 158 and the end plate 146, such spring serving the purpose of urging roller 159 into engagement with the ratchet wheel.

As shown in Fig. X, the ratchet arrangement described above permits ratchet wheel 149 to be rotated in a counterclockwise direction only. When motor 93 rotates shaft 87, through the linkage hereinbefore described, the plate 146 is pivoted about shaft 148, through the crank arm 144 and link 145, in a clockwise direction, as the pivoting mold face 239 is being raised; and ratchet wheel 149 is not rotated, but is restrained from rotating in a clockwise direction by the ratchet arm 152. The ratchet arm 158 rides over the ratchet wheel in such movement of the plate 146, and roller 159 falls into another recess 150.

Referring now to Figs. IX and II, for additional details of the ratchet feed mechanism, the serpentine channel 162, formed by guide rods 162b and 162c, and supported by upright frames 162a carried on the main frame, is provided for the purpose of storing a quantity of reinforcing rods 60 therein to be delivered to the rod feeding mechanism to be hereinafter described. There are usually four of these rod storing channels 162, spaced from side to side of the machine, such channels being themselves in alignment to receive the reinforcing rods and hold them in horizontal alignment, one above the other until they are deposited in the rod feeding mechanism.

Channels 162 are made serpentine or labyrinth-like so that the drag or resistance at the corners or bends of the channels prevent the entire weight of the reinforcing rods stacked therein from being exerted on the rod feeding mechanism.

Upon the horizontally disposed storage rack 162d (Fig. II) is stored a quantity of reinforcing rods 60. The rods are restrained from backward movement by the spaced plurality of posts 162e and from sidewise movement by the end plates 238. Rods 60 are hand fed from the storage rack 162d into the channels 162.

Rod feed wheel 163 has a plurality of recesses 164 spaced about the outer periphery thereof. These recesses 164 are provided to receive reinforcing rods 60 as such rods are deposited from channels 162.

There is a plurality of rod feed wheels 163 spaced along shaft 148, each of which is arranged underneath a channel 162 and above a rod carrying finger assembly and the channels leading thereto, as shown in Fig. IX.

Each of the recesses 164 is substantially the width of the diameter of a reinforcing rod so that when open recesses 164 in the wheels 163 come underneath and in alignment with channel 162, a reinforcing rod will fall by force of gravity into the aligned recesses in the wheels 163. The recesses 164 in each of the wheels are in perfect horizontal alignment so that when a reinforcing rod falls into aligned recesses in the wheels, the rod is held in a straight horizontal position, such recesses 164 being parallel to and equidistantly spaced from shaft 148.

A cover plate 165 extends from the lower end of side 162b of channel 162 and part way around wheel 163 to a point sufficient to allow four of recesses 164 to be exposed on the lower side of wheel 163, so that plate 165 retains all rods 60 within their respective recesses except the four at the lowermost side of the wheel. There is one of these cover plates 165 so attached to each of the channels 162 and so associated with each of the wheels 163.

The arcuate rod retaining segment 166 is attached to torque tube 151. There is one such rod retaining segment in association with each rod feed wheel 163.

When plate 146 is rotated upward in the manner hereinbefore described, it carries with it the rod retaining segments 166 by means of the torque tube 151 to which such segments are attached, and thereby four reinforcing rods 60, previously brought down by the rotation of the wheel 163, are deposited in their respective channels 170 leading to the respective positions of the rods in the rod carrying fingers.

Rod feed wheel 163 and ratchet wheel 149 are attached to a common shaft 148 and therefore rotate in common. Ratchet wheel 149 rotates shaft 148 only in a clockwise direction, as seen in Fig. IX (and counterclockwise as seen in Fig. X), because when plate 146 is rotated upward in a clockwise direction, as in Fig. X, the ratchet arm 158 rides over the ratchet wheel and the ratchet arm 152 restrains the wheel from turning, and therefore rod feed wheels 163 is not rotated.

However, when plate 146 rotates downward in a counterclockwise direction, as in Fig. X, the ratchet arm 152 rides over the ratchet wheel and ratchet arm 158 rotates it, and thereby wheel 163 is rotated.

The rotation of wheel 163 allows additional rods from channels 162 to be deposited in recesses 164 as they pass the lower end of the channels 162. In actual operation the wheel 163 rotates a sufficient distance to pick up four rods upon each movement.

A plurality of tubular supports 167 have their opposite ends attached to the main frame of the machine and run substantially the full width of the machine.

Rods 168 are secured to tubes 167 in such manner as to form a plurality of guide channels 170, such guide channels being for the purpose of guiding the reinforcing rods into the recesses 59 in the rod carrying fingers 58. There is a plurality of these channel forming bars and of the channels formed thereby, there being one set for each rod feed wheel 163. Each channel 170, so formed, guides a reinforcing rod 60 from its position in the wheel 163 to its proper position on the rod carrying fingers.

A triangular shaped deflector 169 is secured to the upper side of the uppermost tube 167 for the purpose of deflecting the two reinforcing rods at the lowest extremity of the wheel 163 into their respective guide channels 170.

When segment 166 is withdrawn upwardly, in the manner hereinbefore described, the four lowermost rods 60 at the bottom of the wheel 163 are allowed to fall into the channels 170 and are guided therethrough onto the fingers 58, to the position shown in Fig. IX.

The separable linkage between rod placing arm 37 and rod placing link 38 is shown in detail in Fig. XII.

The rod placing link 38 has a bifurcated end 172. The ball bearing mounted roller 173 is journaled between the two members of the bifurcated end 172, and is carried on the bolt 174. An elongated slot 175 is provided in each extension member of bifurcated end 172. A sliding block 176 is provided to freely slide back and forth along the outer side of each of the extension members of bifurcated end 172. Bolt 174 passes through the slots 175, the sliding blocks 176 and the roller 173, and thereby the sliding blocks 176 and the roller 173 are permitted to slide back and forth along the slots 175 against the tension of the springs 180.

A fixed bracket 177 is attached to each side member of the bifurcated end 172, and each such bracket has a hole therethrough through which the bolt 178 is free to slide. Bolt 178 has its inner end attached to sliding block 176 and it extends through and has its outer end attached to the outer end of spring 180 by means of washer 179 and nut 181. Spring 180 is thus disposed between bracket 177 and washer 179 and urges block 176 toward bracket 177. The spring assembly just described is duplicated on each side of the bifurcated end 172 of member 38.

A hook 182, the inner side of which is shaped to fit the contour of roller 173, is provided on the upper end of rod placing arm 37. Hook 182 engages roller 173 when arm 37 and link 38 are engaged through operation of the detachable linkage. When hook 182 contacts roller 173, it pushes the roller outward against the tension of spring 180, and this allows roller 173 and hook 182 to be guided into engagement and to become engaged without shock.

The detent arm 183 is pivoted by pivot bolt 184 to bracket 184a which is secured to the main frame of the machine. A ball bearing roller 185 is rotatably attached to the other end of the detent arm 183. The L-shaped limiting arm 186 has its upper end attached to a horizontal side frame of the main frame of the machine, and the horizontal extension 186a thereon extends underneath bracket 187. Such horizontal extension 186a prevents detent arm 183 from falling downward too far for the roller 185 to engage and roll over roller 173 when the detachable linkage is engaged.

Link 38 is prevented from falling downward, after being released, by the use of hook 38a secured to the main frame of the machine.

Bracket 187 has its upper end attached to detent arm 183; and an upwardly extending bolt 188 is secured to an inwardly turned flange of such bracket 187. The upper end of bolt 188 is engaged with the lower end of spring 190. The upper end of spring 190 is secured to an outwardly extending leg of bracket 189, which is attached to the main frame of the machine. Such spring 190 urges detent arm 183 downwardly. A cutout 191 is arranged in the lower edge of detent arm 183 so as to provide clearance for roller 173 and hook 182 when they are engaged. Spring 190 urges detent arm 183 downward and also urges roller 185 thereon into engagement with hook 182 to hold the detachable linkage together when it reaches the end of its travel.

The adjusting bolt 192 is adjustably secured to an upright member of the main frame of the machine and is provided for the purpose of limiting the rearward movement of the movable hopper carriage frame. The upwardly projecting stop 193 is secured to the hopper carriage frame and such stop strikes screw 192 when the hopper carriage frame moves to its rearward position, thus limiting the movement thereof.

In Figs. XV, XVI and XVII is shown the typical construction and operation of the ends of the mold.

Plate 194 is secured to the inner face of fixed mold face 72 near the end thereof. The triangularly shaped stop 195 is secured to plate 194 and extends inwardly therefrom, such stop being provided for the purpose of limiting the outward movement of end mold face 196. End mold face 196 is a separate member and is not attached to plate 194, the upper end thereof being free when end mold face 196 is swung outward.

Strip 197 is secured to plate 194 by means of a suitable weld and extends entirely across end face 196, and serves the purpose of restraining the upper end of member 196 and preventing its movement inwardly of the mold. This arrangement produces a hinged effect between the upper end of the end mold face and strip 197, as is clearly indicated in Fig. XVI. Strip 197, being angularly disposed, allows the formation of a chamfer on the end of the post or other structural member being formed in the mold, such structural member being indicated by broken lines in Fig. XVI and bearing the numeral 205.

Lug 198 is secured to plate 194 adjacent the stop 195, and lug 199 is secured to the outer face of swingable member 196.

Spring 200 is attached between lugs 198 and 199, such spring urging the member 196 toward and against stop 195 or wedge 201, as the case may be.

Plate 203 is secured to the inner face of the pivoting mold face 239, and the wedge-shaped cam 201 is secured to such plate and extends inwardly therefrom, such wedge-shaped cam being provided with an outwardly diverging cam face 206.

An engaging extension 202 is provided on the lower end of member 196 for the purpose of engaging and following cam face 206.

Strip 204 is attached to the inner end of the plate 203 and coincides with the width of the end face 196. Such strip allows the formation of a chamfer on the corner of the post or other structural member 205.

When mold face 239 is pivoted upward from the mold, in the manner hereinbefore described, after the post or other structural member has been molded and vibrated, the extension 202 on end face 196, being urged against wedge cam 201 by spring 200, follows the cam face 206 until the outer side of the member 196 engages stop 195, whereupon end face 196 is restrained from further outward movement. Thus the end face 196 is pulled away from the end of the post or other structural member in the mold, so that the post may be conveyed from the mold without the ends thereof adhering or sticking to the end plates. When the pivoted mold face 239 comes back downward in molding position, as shown in Fig. XV, the cam face 206 engages the extension 202 and such extension follows the cam face 206 to the position shown in Fig. XV and thereby the end face 196 is placed in moldable position relative to the other members of the mold.

End face 196, together with the associated operative mechanism described above, is duplicated at each end of the mold.

In Figs. IV and VII is shown the pulley arrangement for rotating the vibrators in the fixed mold member 72 and in the pivoted mold face 239. Pulley 207 is located behind pulley 208 in Fig. VII, but it is shown in Fig. IV, and is secured to shaft 315a of motor 315, and drives belt 209 and therethrough the pulley 211, such pulley being attached to the shaft which rotates the vibrators in fixed mold face 72.

Pulley 208, which is of the same diameter as pulley 207, is also secured to shaft 315a of motor 315, and through the belt 210 drives the pulley 212 attached to the shaft which rotates the vibrators in the pivoted mold face 239.

Motor 315 rotates the vibrators in fixed mold face 72 and pivoted mold face 239 in common when it is energized at the selected time in the cycle of operation of the machine, as will be described hereinafter.

In Fig. XVIII is shown a perspective view of the mortar hopper 76 mounted upon the moveable carriage 2 therefor.

Pulley 213 is secured to the shaft of motor 316, which motor rotates the vibrator in the elevatable top mold face 126. A pulley 215 is attached to the shaft for the vibrators in top mold face 126, and the belt 214 extends about the pulleys 213 and 215 and therethrough the vibrators are rotated by the rotation of motor 316.

An auger 230 is rotatably disposed between the ends of the hopper 76 and near the bottom thereof and over the opening 76b therein. (See Fig. IV.) A plurality of spokes 231 are arranged about the shaft 230a of the auger; and the skeleton blades or convolutions 232 are arranged upon the outer ends of the spokes. These blades 232 are so arranged that when they are rotated they tend to move the mortar within the hopper away from the center thereof and toward the ends. The auger serves the purpose of agitating the mortar within the hopper and evenly distributing it in the mold through the opening 76b.

The ball bearings 233 (Fig. XI) are flange mounted and arranged on the inner ends of the hopper for the purpose of providing a mounting bearing for the ends of shaft 230a, such ball bearing being duplicated at each end of the hopper.

The gear reduction box 234 is of conventional construction, and is mounted on the outer end of the auger shaft 230a, and therethrough the auger is driven (see Figs. IV and XVIII).

A pulley 235 is secured to a shaft 235a extending from the gear reduction box 234 through which the gears in the gear reduction box are driven. A pulley 237 is secured to shaft 237a of the motor 314, and the belt 236 extends around pulleys 235 and 237, and the auger is therethrough driven by the rotation of the motor 314. The motor 314 is secured to the hopper 76 and moves therewith in the back and forth movement of the hopper.

In Fig. III is shown the mechanism for pushing the hopper back and forth on its carriage. The crank arm 102 is secured to shaft 36, such shaft being driven by the motor 32 through the chain 34 and sprocket 35. Link 104 is pivotally attached to the outer end of crank arm 102 by means of a pivot pin 103 secured therebetween. The other end of link 104 is pivotally attached to the lower outer side of the end of hopper 76 by means of pivot pin 105. The members 102 through 105 are duplicated at each end of the hopper.

When shaft 36 rotates by power from the motor 32 in a clockwise direction (Fig. III), the hopper 76 is pushed forward over the mold through operation of the crank arm 102 and link 104; and when the motor 32 is reversed after a timed interval, the hopper 76 is pulled backward through such linkage, the said hopper moving upon its moveable carriage 2, in each direction.

In Figs. V and XI, an arrangement is shown for adjusting the height of the mortar left in the mold as the carriage retracts and for adjusting the amount of mortar deposited in the mold. The angularly disposed strike off plate 225 extends from one end to the other of the hopper 76 and is adjustably disposed in relation thereto.

An extension 225a is provided on the lower side of plate 225 for the purpose of threadably receiving a plurality of adjusting screws 226.

The angle member 76a is attached to the hopper 76 and extends along the lower side of the strike off plate 225 and is provided to support such plate and to afford an adjusting base for the upward adjustment of plate 225 by screw 226. The inner end of screw 226 engages the upper leg of the angle member 76a.

A plate 228 is spaced from and bolted to the side of hopper 76 at its upper end; and at the lower end thereof it is secured to angle member 76a, such plate 228 being provided for the purpose of carrying screw 227 which urges plate 225 downward.

Screw 226 may be screwed inwardly against the upper leg of angle member 76a and thereby the strike off plate 225 is adjusted upwardly to increase the amount of mortar deposited in the mold and to strike off the mortar at an adjusted height in the mold. The screws 226 and 227 and plate 228 are duplicated at each end of the hopper.

Clearance slots 229 (see Fig. IV) are provided on the inner edge of the adjusting plate 225 for the purpose of allowing clearance for the finger arms 56 and the finger guard arms 67 to pass therethrough when the hopper is moved forward.

Electrical circuits and apparatus provided for the operation of the machine can best be described and understood by referring to the schematic drawing shown in Fig. XXIV, and by referring to the various other figures showing the physical construction and location of the electrical elements.

In Fig. III, the cam 300 is secured to the carriage shaft 36 and rotates with it. Limit switch 302 is attached to the main frame of the machine, and such switch, when tripped by cam 300, energizes relay 303. An actuating arm 301 is provided on limit switch 302, and as shaft 36 rotates, the cam 300 engages arm 301 and actuates switch 302, as long as the cam 300 engages such arm. Relay 303, when thus energized, energizes the auger motor 314.

Limit switch 302 has two contacts therein. Contact 302a is normally closed, and when closed energizes relay 304, through which the top vibrator motor 316 is operated. Contact 302b in limit switch 302 is normally open, but when closed by the operation of the cam 300 it energizes relay 303, which in turn energizes auger motor 314, so that when cam 300 actuates arm 301 of switch 302, the auger motor 314 is started and the relay 304 is deenergized; and when the cam 300 passes arm 301 and releases pressure thereon, the spring actuated switch 302 again reverses the contacts therein and the operation of the motor 314 is stopped and motor 316 is started.

Cam 300 is so positioned on carriage shaft 36 that the auger motor 314 is operating while hopper 76 is over the mold, but this motor deenergized after the carriage has moved back a sufficient distance to allow the top mold face to come down upon the mold, at which time contacts 302a and 302b are reversed, and motor 314 is deenergized and the top vibrator motor 316 is energized.

Relay 303 has an auxiliary contact 303a therein which, when closed through the actuation of switch 302 by cam 300, energizes the holding coil 305a in relay 305, such holding coil controlling the forward motion of the main vibrator motor 315, and it also supplies line current to relay 304. Relay 305 has another holding coil 305b therein which controls the reverse plugging current through vibrator motors 315 and 316 to stop them.

Main vibrator motor 315 rotates the vibrators in the fixed mold face 72 and in pivoting mold face 239. Vibrator motor 315 is attached to a pivoting plate 315a, which plate is supported by the main frame of the machine, such pivoting attachment being provided for the purpose of adjusting the belt tension between the motor and the vibrators. Plate 315a on which motor 315 is mounted may be adjusted upwardly and downwardly by means of the adjusting screw 315b.

When the mold face 239 is pivoted upward, the pulley 212, which drives the vibrator therein, is raised with it and the belt 210, through which the pulley is driven, is loosened; but at such time motor 315 is not running, and belt 210 is again tightened when the pivoting mold face comes back down.

Limit switch 306 is attached to the main frame of the machine, and has an actuating arm 307 extending downwardly therefrom (see Fig. V). When plate 119, attached to the hopper carriage 2, is moved forward by the forward movement of the hopper, such plate strikes actuating arm 307 and opens switch 306 and stops the forward rotation of the carriage motor 32 and thereby the forward movement of the hopper carriage. Switch 306 is normally closed and is spring urged so that when pressure is released from arm 307 by the backward movement of the hopper carriage 32, the switch is again closed.

Plugging switch 308 is of conventional design (see Fig. III). Such switch is mechanically rotated by the carriage motor 32 through belt 326 driven by pulley 327 attached to the shaft of motor 32. The contact 308a in the plugging switch 308 is closed by the rotation of the switch, and, when closed, reverses the flow of current through the motor 32 upon the closing of normally closed contacts 30a in relay 30 upon deenergizing of relay 30, and immediately stops the forward rotation of the said motor.

Upon stopping of motor 32, contacts 308a are opened, deenergizing the motor 32 in its stopped condition. Contact 308b in such switch, when closed by the reverse rotation of motor 32, reverses the flow of current through motor 32 and immediately stops the reverse rotation of the said motor in the same manner that contacts 308a stopped the forward rotation of said motor.

A plugging switch, such as indicated by the numeral 308, is a conventional and commercial type of switch which is employed for the purpose of stopping the rotation of a motor and preventing its coasting. It is mechanically rotated by the motor, and the contacts therein are closed only when the motor is rotating. When the motor has been brought to a complete stop, the plugging switch is no longer actuated, and it is open. Switch 308 is provided with a contact adapted to be closed upon each direction of rotation of the motor 32, whether forward or backward.

Limit switch 311 provides for the energization of the carriage motor 32 to rotate it in reversed direction and to move the hopper carriage backward. Such limit switch is attached to the main frame of the machine and has an actuating arm 312 thereon. An arm 309 is attached to the carriage shaft 36 for the purpose of contacting actuating arm 312, such arm 309 having an adjustment screw 310 on the end thereof which strikes actuating arm 312, as the shaft 36 rotates and thereby opens the switch 311 and thus deenergizes the motor 32 and stops the reverse movement of the hopper carriage. Switch 311 is normally closed and is spring actuated so that when the pressure is released from arm 312, the switch is again closed.

Time delay relay 26 receives current from contact 29a of relay 29 and supplies current in reversible direction to the coils of the actuating relays controlling the carriage motor 32. When relay 26 is energized, as aforesaid, it deenergizes relay 30 and energizes relay 313 through contacts 26b and 26a, respectively, such action occurring after the adjusted time interval at which the relay 26 is set.

Also through the contact 26c in relay 26, such relay, when energized, initiates the time interval in relay 27.

During the set time interval of relay 26, the motor 32 is inoperative, after the hopper carriage has reached its forward limit, and the hopper carriage is at a standstill, during which time the vibrator motor 315 and auger motor 314 are rotating.

When the forward holding coil 305a, in the relay 305, is energized and is operating the vibrator motor 315 for the stationary and pivoting mold faces, voltage is applied therethrough upon the line side of starting relay 304, which places the relay 304 in position to start the motor 316 when cam 300 agains contact the actuating arm 301 to open switch 302 and open contact 302a therein.

After the carriage motor 32 has been reversed in rotation by the closing of contact 26b in relay 26, as described above, and the hopper carriage is moving backward, the cam 300 releases switch 302, which opens contact 302b therein and closes contact 302a. The opening of contact 302b stops the auger motor 314.

The vibrator motor 316 is then operating, as aforesaid, and the holding circuit 305a in relay 305 draws its current through contact 27a in time relay 27, for the period of time at which relay 27 is set, which thus keeps the vibrator motor 315 energized and rotating after the motor 314 has stopped.

Thus both vibrator motors are in operation, the closing of the contact 302a, as aforesaid, having energized the starting relay 304 and thereby providing for the energization of motor 316.

As the carriage moves toward its rearward position and after motor 314 has been deenergized, as aforesaid, the contact 310 on arm 309 strikes actuating arm 312 on switch 311 and opens switch 311 and thereby deenergizes relay 313, whereupon the plugging switch 308, due to its closing by the rotation of the motor 32, closes relay 30 and supplies a reversed flow of current through motor 32 and brings it to an immediate stop when it is deenergized, as aforesaid.

Thus, the carriage motor is brought to a quick stop and all vibrators are running, and the hopper carriage has reached the limit of its rearward movement.

When the time delay at which relay 27 is set is over, the contact 27a therein opens and the contact 27b closes. Contact 305a in relay 305 is opened, which deenergizes the vibrator motors 315 and 316.

When contact 27b closes, power is supplied through contact 28a, in relay 28, which energizes the coil 305b in relay 305, and current is supplied therethrough in a reversed direction to motors 315 and 316, stopping them quickly and preventing them from coasting.

Contact 27c is closed at the end of the time interval of the time delay relay 27, and therethrough a short time cycle is set up in time delay relay 28. The time delay interval provided by relay 28 is sufficient merely to allow motors 315 and 316 to be brought to a stop.

At the end of time delay interval of relay 28, the contact 28a therein is opened, which deenergizes coil 305b in relay 305 and thereby stops the reversed flow of current through motors 315 and 316, and they are thereby completely deenergized.

At the same time that contact 28a opened the contact 28b closed. When contact 28b is closed, it energizes starting relay 317 for motor 93 and starts it. Motor 93 controls the operation of the pivoting mold face 239 and the rod feed mechanism in the manner which has been hereinbefore described.

At this time the mortar hopper carriage is in its rear position, and the motor therefor is deenergized; and the vibrators are not operating.

Motor 93, after being thus energized, raises the pivoted mold face 239 and operates the rod feed mechanism to load the retracted rod carrying fingers with reinforcing rods; and the motor 93 continues to run until arm 318 attached to, and carried by, shaft 92 on motor 93 strikes the actuating arm 319 for the limit switch 320 (see Fig. II). Limit switch 320 is attached to the main frame of the machine and has an actuating arm 319 extending downwardly therefrom in position to contact arm 318, as the motor 93 is rotated.

Switch 320 has two contacts therein, 320a and 320b. Contact 320a is normally closed, but it is opened when arm 318 strikes arm 319.

The opening of contact 320a breaks the holding circuit in relay 29, causing it to open, through which such relay 29 power has been supplied to the starting relay 317 for motor 93.

When the holding circuit in relay 29 is thus opened, the contact 29a therein is opened, and the line leading to contacts 26a and 26b is broken, and the line leading to contact 28b is broken. This deenergizes relay 317 which stops the rotation of motor 93.

The deenergization of relay 29, as aforesaid, closes the normally closed contact 29b therein, which supplies voltage to the holding circuit of relay 317, such holding circuit being provided for the purpose of the further operation of motor 93. The contact 29b was opened when the relay 29 was energized.

Contact 29c was closed when relay 29 was energized and therethrough the time cycle in relay 26 was initiated. When contact 29c is broken, as aforesaid, relay 26 is deenergized, which returns it to starting position, which in turn returns relays 27 and 28 to starting position.

At the time that the limit switch 320 was actuated, as aforesaid, the contact 320b therein was momentarily closed. This operation energized relay 321, which started the pallet driving motor 11; and the pallets 20 are moved along the rails 3. The relay 321 has a holding circuit therein which provides for continued operation of the motor 11.

At this moment, the motor 93 has been stopped, and the top mold face 239 is in raised position; and the motor 11 has been started.

Movement of the chains 4 by motor 11 causes a pair of lugs 8 to engage the lowermost pallet 20 in the pallet magazine and push it along rails 3. Another pair of lugs 8 are already engaged with the pallet immediately underneath the mold, with a molded structural member thereon, and they slide the pallet and structural member out from under the mold and convey them to the delivery end of the machine; and another pallet is conveyed to proper position under the mold.

Limit switch 21 is secured to the main frame of the machine (Fig. II) and has an actuating arm 22 and actuates limit switch 21. This opens contact 21a, in limit switch 21, and thereby breaks the holding circuit in relay 321 and stops the rotation of the motor 11, thus stopping the movement of the pallet carrying chains 4. At the same time, the contact 21b in limit switch 21 is closed momentarily, which energizes relay 317 for the second time and starts motor 93, which through the linkage thereto, described above, brings the pivoted mold face 239 downward in position to form a side of the mold, and the mold is thus formed in position to receive another charge of mortar from the hopper.

Arm 322 (Fig. III) is journaled near the end of the ratchet wheel shaft 148, and the other end thereof is secured to torque tube 151, so that such tube may swing arcuately about the ratchet wheel shaft 148.

Limit switch 324 is secured to the main frame of the machine and has an actuating arm 323 extending upwardly therefrom. As torque tube 151 comes downward, with the rod feed ratchet end plate 146, in response to the rotation of the motor 93 (when the pivoted mold face 239 is brought downward) the arm 322 strikes the roller 323a on the actuating arm 323 and actuates limit switch 324.

The limit switch 324 has two contacts therein, 324a and 324b. Contact 324a is normally closed, but is opened when the limit switch is thus actuated and breaks the holding circuit in relay 317, stopping the motor 93 for the second time, leaving the pivoting mold face 239 in lowered position.

The contact 324b in limit switch 324 is closed by the actuation of such switch, and this sets up the starting of another cycle of operation of the machine.

The manually operable switch 325 is connected in parallel with the momentary contact push button switch 31, and when such switch 325 is in closed position, it short circuits switch 31 and provides for the continuous automatic operation of the machine, but when the switch 325 is open, each cycle of operation of the machine must be instituted by pressing the push button switch 31.

Push button switch 31 will not institute a cycle of operation of the machine unless all of the mechanism and circuits are in proper position for the beginning of a cycle of operation.

The normally closed pushbutton switch 328, when pressed, is opened and deenergizes all of the motors in the machine in the event of emergency.

Having described in detail the various parts and elements of my invention shown in the drawings, together with the function thereof, in order to make the operation of the machine clear, one complete cycle of operation will be described in orderly sequence.

Preparatory to beginning the operation of the machine, a supply of pallets 20 is stacked in the pallet magazine at the back of the machine. By either manually turning the motor 11 or turning it by an auxiliary switch (not shown), the pallet chains 4 are moved forward until a pallet is underneath the mold.

Then a supply of reinforcing rods is placed on the storage rack 162d and in the channels 162.

The motor 93 is then manually turned, or turned by means of an auxiliary switch (not shown) until the rod feed wheel 163 is loaded with reinforcing rods 60, in the manner shown in Fig. IX. Each turn of the motor 93 raises the pivoting mold face 239 and, through linkage described above, operates the rod feed ratchet wheel 149. Each movement of the rod feed shaft 40 rotates the rod feed wheel 163 a distance equal to four of the recesses 164 on the outer periphery thereof, and the wheel picks up four reinforcing rods 60 from channels 162 disposed thereabove.

After the required number of turns of motor 93, four reinforcing rods are in place over their respective channels 170, leading to the rod carrying fingers 58.

Before beginning the operation of the machine the carriage 2 should be completely retracted to starting position, holding the rod carrying fingers 58 in retracted position, in place to receive the rods from the rod feed wheel.

In the retracted position of the rod carrying fingers the finger cover guards 68 are pushed back in position to clear the recesses 59 in the fingers so that reinforcing rods may be permitted to fall in these recesses. The finger cover guards are pushed back by the clockwise rotation of finger supporting bar 44 (Fig. IX) when the finger assembly is retracted, causing the engagement of screw 101, on the torque tube 43, with the finger guard supporting bracket 64.

After the rod feed wheel has thus been loaded, the further rotation of motor 93 raises the pivoting mold face assembly, and the rod feed torque tube 151 rises, moving arcuately upward the rod retaining segments 166 and thus removing such segments from further support of the four lowermost reinforcing rods which are carried in the extreme bottom of wheel 163, and then the rods are allowed to fall to their respective recesses 59 in the rod carrying fingers. As the pivoting mold face again drops in response to the further rotation of motor 93, the ratchet wheel 149 rotates, carrying the rod retaining segment 166 back downward, and four more rods are fed to the upper part of wheel 163, and four additional rods are placed over the channels 170 and there supported by the said segments in position to be deposited on the fingers 58 at the end of the first cycle of operation.

The pallets and the reinforcing rods are now in proper initial place and position to begin the automatic operation of the machine. The hopper 76 is filled with mortar, and the machine is then ready to begin a cycle of operation.

To begin the automatic operation of the machine, the switch 23 is momentarily closed, which closes relay 24. This relay remains closed by reason of the fact that it has a holding circuit therein. This operation sets up all automatic circuits and also energizes the vacuum tubes in the time delay relays. A short period is allowed in which to warm up the vacuum tubes.

To operate one cycle only, the switch 31 is momentarily closed, which energizes the relay 29, such relay 29 remaining energized by the holding contacts 29d therein.

Through time delay relay 26, the relay 30 is closed, starting the carriage travel motor 32 and initiating the time interval of relay 26.

As motor 32 rotates, the hopper carriage 2 moves forward, through the operation of crank arm 102 and link 104, located at each side of the machine. The motor 32 also rotates rod placing shaft 40, through the rod placing arm 37, the rod placing link 38 and the crank arm 39.

The rotation of the rod placing shaft 40 moves the rod supporting finger bar 44, through links 41 and 42, operatively connected between the rod placing shaft 40 and the finger supporting bar 44. The links 42 are held in alignment by the torque tube 43 extending between links 42 at each side of the machine, such torque tube requiring the finger supporting bar 44 to always remain parallel to the rod placing shaft 40.

As the rod placing shaft 40 rotates, the rollers 46 and 47 are caused to travel in their respective channnls 49 and 48 and impart counterrotation to the finger supporting bar 44 through the L-shaped arm 45, which is attached to the bar 44, the bar 44 being free to rotate in the ends of the links 42. This brings the fingers 58 over and downward from the position shown in broken lines in Fig. VI to the position in the mold shown in full lines in Fig. VI.

The finger cover guards 68 are individually hinged at each set of fingers, as described hereinbefore, and are urged into engagement with the rods 60 by the spring 71 and thus retain the rods on the fingers 58 while the fingers are moved to the mold.

As the loaded rod carrying fingers move over and downward toward the mold, as aforesaid, the screw 101 is released from engagement with bracket 64, and the finger cover guards are released, and by the retraction of springs 71 they are caused to engage the rods in the fingers and prevent them from falling out.

As the rod carrying fingers reach filling position in the mold, the rod placing arm 37 disengages from the rod placing link 38, in the manner hereinbefore described, and the hopper carriage continues to move forward without further movement of the rod placing mechanism, except as follows: As the hopper carriage thus moves further forward, by the rotation of the carriage shaft 36, the crank arm 54 has rotated far enough to pull the link 53 backward and, through crank arm 52, rotates the rod release shaft 51 and turns the bucket cam 50 about in the position shown in Fig. XX. This moves the finger bar roller 47 forward, and with it all finger assemblies move forward and upward in the mold to final filling position, as shown in Fig. XX.

As the hopper carriage is moving forward toward the final filling position over the mold, the cam 300 on the carriage shaft 36 actuates switch 302, energizing relay 303. This starts the auger motor 314, and the auger within the hopper is therethrough made to rotate. This agitates the mortar in the mold and causes it to move toward the ends of the hopper and become evenly distributed in the mold.

By auxiliary contacts in relay 303, the relay 305a is energized, and therethrough the motor 315 is energized and rotates the vibrators in the stationary mold face 72 and in the pivoted mold face 239.

Relay 305 also supplies current to the line side of relay 304, but such relay does not close due to the fact that the limit switch contacts 302a are in open position.

As the hopper carriage reaches the forward limit of its travel, the plate 119, on which the elevatable top mold assembly 126 is mounted, and which is moving with the hopper carriage, engages arm 307 on the limit switch 306 and actuates such switch and thereby deenergizes motor 32. The plugging switch 308, driven by motor 32 operates when such motor stops rotating and immediately stops the motor and prevents it from coasting.

At this time the vibrator motor for the stationary mold face and the pivoting mold face is still running, and the auger motor continues to run, stirring the mortar.

At the end of the adjusted time interval of time delay relay 26 through which the carriage motor 32 is energized, the contacts therein reverse, energizing relay 313, thereby reversing the rotation of motor 32 and causing the carriage to start to move backward to its rearward limit.

At the end of the time interval of relay 26, it also initiates the time interval of the relay 27.

As the hopper carriage retracts, the limit switch 302 returns to its normal position by reason of the cam 300 passing the actuating arm 301 and allowing the arm to retract. This deenergizes relay 303 and stops the auger motor 314.

The holding circuit of 305a, in the relay 305, remains closed and therethrough the vibrator motor 315 continues to run.

Relay 304 is now energized through relay 305a, and through the normally closed contacts of the limit switch 302, and therethrough motor 316, which rotates the vibrator in the elevatable mold face 126, is started.

As the hopper carriage continues its rearward travel, the rod release mechanism, hereinbefore descibed, reverses its movement from that hereinbefore described and moves the rod carrying fingers down and rearward in the mold, forcing the fingers through the compacted and vibrating mortar in the mold. The reinforcing rods are now supported in the compacted mortar and are held in place thereby, the rod carrying fingers being allowed to draw away from the reinforcing rods and rearward thereof so that such fingers may be withdrawn upward out of the mold and leave the reinforcing rods therein. The rod retaining cover guards are engaged by the reinforcing rods and are held in place by the rods while the rod carrying fingers are pulled away therefrom. This is clearly shown in Fig. XXIII. This is done in order that when the hopper carriage has retracted to a point where the rod placing arm 37 makes contact with the rod placing link 38 and they are joined together by the detachable linkage therebetween, previously described, through such linkage the rod carrying fingers are vertically raised in the mold and retracted therefrom, leaving the rods in place in the mortar. After the limit of the tension of the spring 71 has been reached, the rod retaining cover guards are withdrawn from the mold with the rod carrying fingers. The reinforcing rods are thus finally left in the mold.

As the hopper carriage approaches the limit of its rearward movement, the arm 132 engages latch 135, and the arm 132 rotates shaft 131, releasing the latching cam arms 130 from under the rollers 128, and the top mold assembly is released and allowed to drop upon the mortar in the mold. The top mold face is held down by its own weight.

As the hopper carriage reaches the limit of its rearward movement, contact 310 on the arm 309, carried by the carriage shaft 36, strikes the actuating arm 312 on the limit switch 311, and the switch 311 is opened, de-energizing the motor 32. Such motor is brought to a quick stop by the plugging action of the plugging switch 308, as hereinbefore described.

The vibrators in all of the mold faces are now vibrating, and they are all in moldable position relative to the mold, and they continue to vibrate during the time interval at which the time delay relay 27 is set, compacting the mortar about the reinforcing rods therein and closing the voids left by the withdraway of the fingers.

At the end of the adjusted time interval of relay 27, the holding circuit 305a of relay 305 is broken, and the circuit 305b is immediately closed, stopping the vibrator motors 315 and 316 by reversing the current therethrough. At the same time, the time interval of relay 28 is initiated. This time interval is very short, being sufficient in length only to bring the vibrator motors 315 and 316 to a stop.

At the end of the time interval of relay 28, relay 305b is opened and relay 317 is closed through contacts in the time delay relay 28.

The closing of relay 317 starts motor 93, which through the link 90 and the crank arm 89 rotates the shaft 87 and therethrough pivots the pivoting plate 81 upward in a 90 degree rotation, carrying with it the pivoted mold face 239.

The rollers 108 are carried upward by the torque tube 106 and engage the under side of the horizontal plates 119, attached to the top mold assembly, and raise the top mold assembly upward to a point where the latches 130 will come underneath the rollers 128 and hold the top mold assembly up, in the manner which has already been described.

As the motor 93 rotates the shaft 87, it moves the rod feed link 145 through the crank arm 144, and operates the rod feed ratchet, in the manner hereinbefore described, and additional reinforcing rods are fed to the rod carrying fingers.

As the pivoting mold face assembly approaches the limit of its upward movement, the arm 318, carried by the shaft 92 of the motor 93, engages the arm 319 on the limit switch 320 and opens the normally closed contact 320a in the limit switch 320, which breaks the holding circuit of relay 29, de-energizing all relays in the machine except relays 24 and 321 which permit the start of another cycle of operation of the machine by returning all time relays to a starting condition.

The actuation of the switch 320, as aforesaid, stops the motor 93 with the pivoting mold face 239 in raised position.

When the limit switch 320 was actuated, the normally open contact 320b therein was momentarily closed and closed the relay 321, starting the pallet chain driving motor 11, and the pallet chains 4 move ahead, removing the finished post from under the mold to the delivery end of the machine, and also bringing another pallet from the pallet magazine to position under the mold ready for the next cycle of operation.

As this position is reached, one of the pallet driving lugs 8, carried by the pallet chains 4, engages the actuating arm 22 on the limit switch 21, opening the normally closed contacts 21a of such switch, breaking the holding circuit of relay 321, and deenergizing motor 11.

The normally open contact 21b of switch 21 is momentarily closed by the actuation of switch 21, and closes the relay 317. This relay is held closed by its holding circuit, energized through normally closed contacts 29b in relay 29. This again starts the motor 93 which operates the pivoting mold face 239 and the rod feed mechanism. This brings the pivoting mold face 239 down to moldable position relative to the mold, and through the linkage described above, additional reinforcing rods are fed to the rod feed wheel 163 from the rod holding channels 162.

This pivots the rod feed ratchet end plate 146 downward, carrying downward with it the torque tube 151 secured to such end plate. As such tube pivots downward, the arm 322 attached thereto engages the actuating arm 323 on the limit switch 324 and actuates the said switch, which opens the normally closed contact 324a in such switch and breaks the holding circuit of relay 317, thus stopping the motor 93, leaving the pivoting mold face 239 in its lowered position. Also through contacts 324b starting switches 31 and 325 are energized, through which another cycle may be initiated.

This completes one entire cycle of operation of the machine. Continuous cycling of the machine is always identical and continuously uninterrupted while the switch 325 is closed; but when switch 325 is open, it is necessary to energize the pushbutton switch 31 in order to begin each cycle of operation.

From the foregoing it will be seen that I have disclosed an invention providing method for automatically producing structural members of uniform character, rapidly, in great numbers and at low cost, the practice whereof resulting in great savings in time, overhead expense and labor.

The products made by employing my invention may be reinforced to give them added strength through the use of metal reinforcing members, or not, as desired. Such members are automatically placed within the product as it is being manufactured; and this is done without any manual assistance whatsoever.

My method contemplates the making of structural members through the mixture of an aggregate and a suitable binder to produce a plastic cementitious mass. Typical of the components thereof are sand and/or gravel and/or rock, mixed with hydraulic cement and a small amount of water. Ordinarily the aggregate used is granular and/or crushed material. However, the so-called "light-weight" aggregates may be used.

The amount of water introduced into the mixture is relatively small, as such mixture should be a semi-dry preparation. In such state the mixture initially abounds in tiny voids throughout. These can be greatly reduced and the density of the mixture increased by properly impacting the mass through vibration. This is done automatically and in evenly dispersed areas and in uniform measure throughout.

Localized vibrators of relatively high frequency are disposed about the form or mold in which the structural member is produced. The mixture is vibrated and impacted during the process of creating the final product. Vibrators are so associated with the several members comprising the form or mold as to particularly localize the source centers of vibration with respect to predetermined areas in such members. This is so done as to transmit such vibration to the mass in evenly distributed proportions, and to prevent that periodicity which results in unwanted nodes.

The result of the practice of such method is the production of structural members of unusual uniformity throughout, so that their strength and other desired physical properties are of the highest character. Internal stresses and deviations from uniformity are noticeably absent. Structural members produced through the use of my invention are of uniform high quality, and they also have a pleasing appearance in that exposed surfaces are smooth and even and well finished.

Of great commercial importance is the quick, standardized and dependable practice of placing metal reinforcement within the body of the product at uniformly spaced predetermined positions so as to create a product of great strength and unvarying resistance to stress throughout its body.

Equally important are the operations of placing the reinforcing members within the product during the time of its manufacture, and impacting of the mixture thereabout during such time, and the automatic withdrawal of the fingers which temporarily support the reinforcing members, such withdrawal being accomplished during a time of vibration, and the scars or openings momentarily left by such withdrawal being entirely obliterated, filled and dissipated automatically before the product is finished, so that the places where such withdrawals were effected cannot be thereafter determined by inspection.

The precise and automatic operations by which the forms or molds are quickly assembled to receive, support and manufacture a structuarl member is of distinct advantage. And so, too, is the automatic and quick dismantling of such forms upon the completion of the manufacture of each given unit.

The final product is of such compactness, uniformity, initial strength and integrity that it may be at once freed from all molds in which it is formed and be thereafter supported solely on the base plate or pallet on which it was created. It may then be automatically carried away on the base plate for storage until finally cured, by being allowed to set and dry under atmospheric conditions. However, steam curing of the final product to hasten its hardening may be practiced, if desired.

The shapes and forms of the products made by my method are infinite in variety, as all standard concrete structural members employed in the building trades may be duplicated by my invention, with the added advantage of their greater uniformity and machine-like precision.

I claim:

1. The method of molding a structural member from mortar or the like comprising: the placement by placing elements of reinforcing members in a mold, the deposit of a quantity of mortar within the mold about the reinforcing members, the withdrawal from the mold of the elements employed to place the reinforcing members, and vibrating the mortar with the reinforcing members therein after the withdrawal of the reinforcing placing elements.

2. The method of molding a structural member from mortar or the like comprising: the placement of reinforcing members in a mold, the deposit of a quantity of mortar within the mold about the reinforcing members, the vibration of the mortar, the withdrawal of reinforcing placing members from the mold, and the further vibration of the mortar with the reinforcing members therein after the withdrawal of the reinforcing placing members.

3. A method of making structural members comprising: the mixing of cementitious material to form a plastic mass, the introduction of a quantity of such mass into a space defining a desired structural member, and the compacting of such mass in such space by the application thereto of a progressing wave form of vibration.

4. A method of making structural members comprising: the mixing of cementitious material to form a plastic mass, the introduction of a quantity of such mass into a space defining a desired structural member, and the compacting of such mass in such space by the simultaneous application thereto of vibrating impulses originating from a plurality of separated areas disposed about such space, the vibrating impulses being out of phase and acting separately and in successive order.

5. A method of molding a structural member from mortar or the like comprising: the employment of placing members to place reinforcing rods in a mold in spaced relationship to the walls of the mold, the deposit of a quantity of mortar within the mold about the rods, thereby enclosing the rods in the mortar, the vibration of the mortar, the withdrawal of the reinforcing placing members from the mold, and the vibration of the mortar with the reinforcing rods therein after the withdrawal of the reinforcing placing members.

6. The method of compacting a freshly mixed cementitious mass placed within a defining mold, comprising; the use of a series of separate vibratory forces successively applied at the termini of a plurality of intervals of space located on a common face of the mold, each such force being so applied at a time when no other such force is being so applied, thereby creating progressive waves of vibration in the mass.

7. A method of molding a structural member from mortar or the like comprising: the placing of reinforcing rods into position in a mold by the movement of placement members carrying said rods into the mold, said rods being supported and held in spaced relationship to each other and to the walls and ends of the mold solely by the placement members, and being free of attachment to the mold; the deposit of a quantity of mortar within the mold about the reinforcing rods while the rods are supported by the placement members; the removal of the placement members from the mold; and the vibration of the mortar after the removal of the placement members.

8. A method of molding a structural member from mortar or the like comprising: the placing of reinforcing rods into position in a mold by the movement of placement members carrying the rods into the mold, said rods being supported and held in spaced relationship to each other and to the walls and ends of the mold solely by the placement members, and being free of attachment to the mold; the deposit of a quantity of mortar within the mold about the reinforcing rods; the vibration of the mortar; the withdrawal of the placement members from the mold; and the further vibration of the mortar after the withdrawal of the placement members.

References Cited in the file of this patent

UNITED STATES PATENTS

| | | |
|---|---|---|
| 1,169,834 | Kane | Feb. 1, 1916 |
| 1,173,880 | Shearer | Feb. 29, 1916 |

(Other references on following page)

UNITED STATES PATENTS

| | | | |
|---|---|---|---|
| 1,387,175 | Price | Aug. 9, | 1921 |
| 1,643,578 | Eaton et al. | Sept. 27, | 1927 |
| 1,922,168 | Lowell | Aug. 15, | 1933 |
| 2,296,562 | Maxwell | Sept. 22, | 1942 |
| 2,298,006 | George | Oct. 6, | 1942 |
| 2,299,072 | Rogers et al. | Oct. 20, | 1942 |
| 2,299,111 | Rogers et al. | Oct. 20, | 1942 |
| 2,394,943 | Stancliffe | Feb. 12, | 1946 |
| 2,407,168 | Lindkvist | Sept. 3, | 1946 |
| 2,431,034 | Gelbman | Nov. 18, | 1947 |
| 2,492,415 | Coates et al. | Dec. 27, | 1949 |
| 2,522,116 | Hayes | Sept. 12, | 1950 |